(12) United States Patent
Yi et al.

(10) Patent No.: US 11,849,466 B2
(45) Date of Patent: Dec. 19, 2023

(54) METHOD AND APPARATUS FOR TRANSMITTING DOWNLINK CONTROL INFORMATION IN WIRELESS COMMUNICATION SYSTEM

(71) Applicant: LG Electronics Inc., Seoul (KR)

(72) Inventors: Yunjung Yi, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/203,407

(22) Filed: May 30, 2023

(65) Prior Publication Data

US 2023/0309105 A1 Sep. 28, 2023

Related U.S. Application Data

(63) Continuation of application No. 17/382,918, filed on Jul. 22, 2021, now Pat. No. 11,706,781, which is a continuation of application No. 16/714,406, filed on Dec. 13, 2019, now Pat. No. 11,102,771, which is a continuation of application No. 16/303,970, filed as application No. PCT/KR2018/010640 on Sep. 11, 2018, now Pat. No. 10,512,072.

(60) Provisional application No. 62/630,236, filed on Feb. 13, 2018, provisional application No. 62/593,991, filed on Dec. 3, 2017, provisional application No. 62/587,521, filed on Nov. 17, 2017, provisional application No. 62/558,862, filed on Sep. 15, 2017, provisional application No. 62/557,124, filed on Sep. 11, 2017.

(30) Foreign Application Priority Data

Sep. 11, 2018 (KR) .................. 10-2018-0108419

(51) Int. Cl.
*H04W 72/23* (2023.01)
*H04W 72/0446* (2023.01)
*H04W 72/542* (2023.01)

(52) U.S. Cl.
CPC ....... *H04W 72/23* (2023.01); *H04W 72/0446* (2013.01); *H04W 72/542* (2023.01)

(58) Field of Classification Search
None
See application file for complete search history.

(56) References Cited

U.S. PATENT DOCUMENTS

| | | | |
|---|---|---|---|
| 2021/0242955 A1* | 8/2021 | Suzuki | H04L 27/2601 |
| 2021/0298029 A1* | 9/2021 | Liu | H04W 72/0453 |
| 2021/0368509 A1* | 11/2021 | Lin | H04W 72/0453 |
| 2022/0116143 A1* | 4/2022 | Luo | H04L 1/0079 |
| 2022/0140968 A1* | 5/2022 | Luo | H04L 5/0094 370/329 |

* cited by examiner

*Primary Examiner* — Hong S Cho
(74) *Attorney, Agent, or Firm* — Fish & Richardson P.C.

(57) ABSTRACT

A method and apparatus for monitoring downlink control information (DCI) in a wireless communication system, especially in a new radio access technology (NR) is provided. A user equipment (UE) monitors first DCI having a first size in a UE specific search space (USS). The the first size is determined based on an active bandwidth part (BWP). The UE further monitors second DCI having a second size in a common search space (CSS). The second size is determined based on a default BWP.

15 Claims, 16 Drawing Sheets

METHOD AND APPARATUS FOR TRANSMITTING DOWNLINK CONTROL INFORMATION IN WIRELESS COMMUNICATION SYSTEM

CROSS-REFERENCE TO RELATED APPLICATIONS

This application is a continuation of U.S. application Ser. No. 17/382,918, filed on Jul. 22, 2021, which is a continuation of U.S. application Ser. No. 16/714,406, filed on Dec. 13, 2019, now U.S. Pat. No. 11,102,771, which is a continuation of U.S. application Ser. No. 16/303,970, filed on Nov. 21, 2018, now U.S. Pat. No. 10,512,072, which is National Stage application under 35 U.S.C. § 371 of International Application No. PCT/KR2018/010640, filed on Sep. 11, 2018, which claims the benefit of Korean Application No. 10-2018-0108419, filed on Sep. 11, 2018, U.S. Provisional Application No. 62/630,236, filed on Feb. 13, 2018, U.S. Provisional Application No. 62/593,991, filed on Dec. 3, 2017, U.S. Provisional Application No. 62/587,521, filed on Nov. 17, 2017, U.S. Provisional Application No. 62/558,862, filed on Sep. 15, 2017, and U.S. Provisional Application No. 62/557,124, filed on Sep. 11, 2017. The disclosures of the prior applications are incorporated by reference in their entirety.

BACKGROUND OF THE INVENTION

Field of the Invention

The present invention relates to wireless communications, and more particularly, to a method and apparatus for designing/transmitting downlink control information (DCI) and/or determining a transport block size (TBS) in a new radio access technology (NR) system.

RELATED ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

There are various downlink control information (DCI) formats used in LTE in a control channel. The DCI format is a predefined format in which the DCI is packed/formed and transmitted in the control channel. The DCI formats tell a user equipment (UE) how to transmit/receive its data on a data channel. So, based on the DCI format transmitted in the control channel, a UE can transmit/receive data. The DCI format gives the UE, details such as number of resource blocks, resource allocation type, modulation scheme, transport block, redundancy version, coding rate etc.

NR may also use DCI formats. But, enhancements for DCI formats should be required to reflect the features of NR.

SUMMARY OF THE INVENTION

The present invention discusses DCI design aspects and TBS determination related to NR.

In an aspect, a method for monitoring downlink control information (DCI) by a user equipment (UE) in a wireless communication system is provided. The method includes monitoring first DCI having a first size in a UE specific search space (USS), wherein the first size is determined based on an active bandwidth part (BWP), and monitoring second DCI having a second size in a common search space (CSS), wherein the second size is determined based on a default BWP.

In another aspect, a user equipment (UE) in a wireless communication system is provided. The UE includes a memory, a transceiver, and a processor, operably coupled to the memory and the transceiver, that controls the transceiver to monitor first downlink control information (DCI) having a first size in a UE specific search space (USS), wherein the first size is determined based on an active bandwidth part (BWP), and controls the transceiver to monitor second DCI having a second size in a common search space (CSS), wherein the second size is determined based on a default BWP.

In another aspect, a method for transmitting downlink control information (DCI) by a base station (BS) in a wireless communication system is provided. The method includes transmitting first DCI having a first size in a UE specific search space (USS), wherein the first size is determined based on an active bandwidth part (BWP), and transmitting second DCI having a second size in a common search space (CSS), wherein the second size is determined based on a default BWP.

DCI can be designed efficiently for NR. Furthermore, TBS can be determined efficiently for NR.

DESCRIPTION OF EXEMPLARY EMBODIMENTS

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
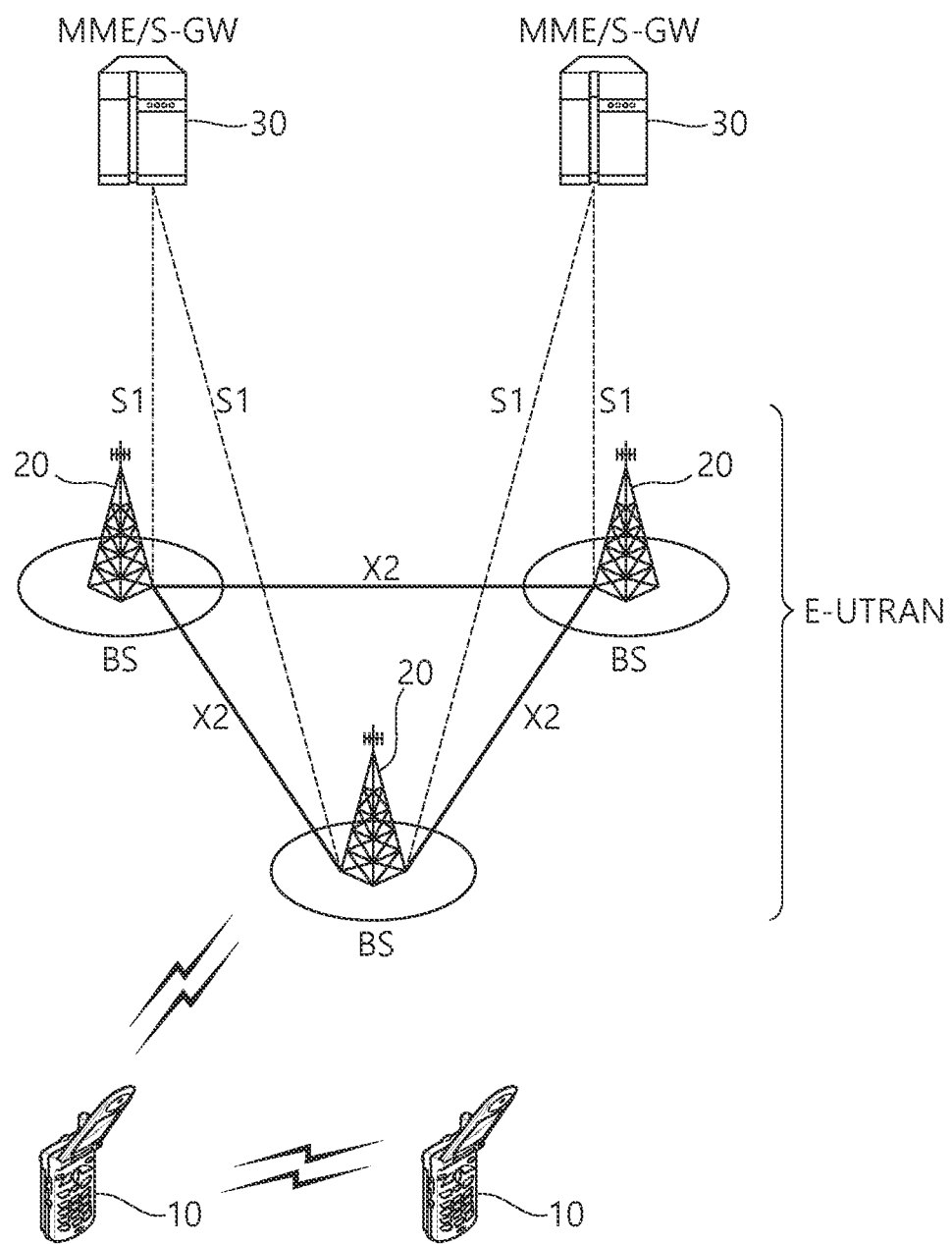
FIG. 1 shows an example of a wireless communication system to which technical features of the present invention can be applied.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
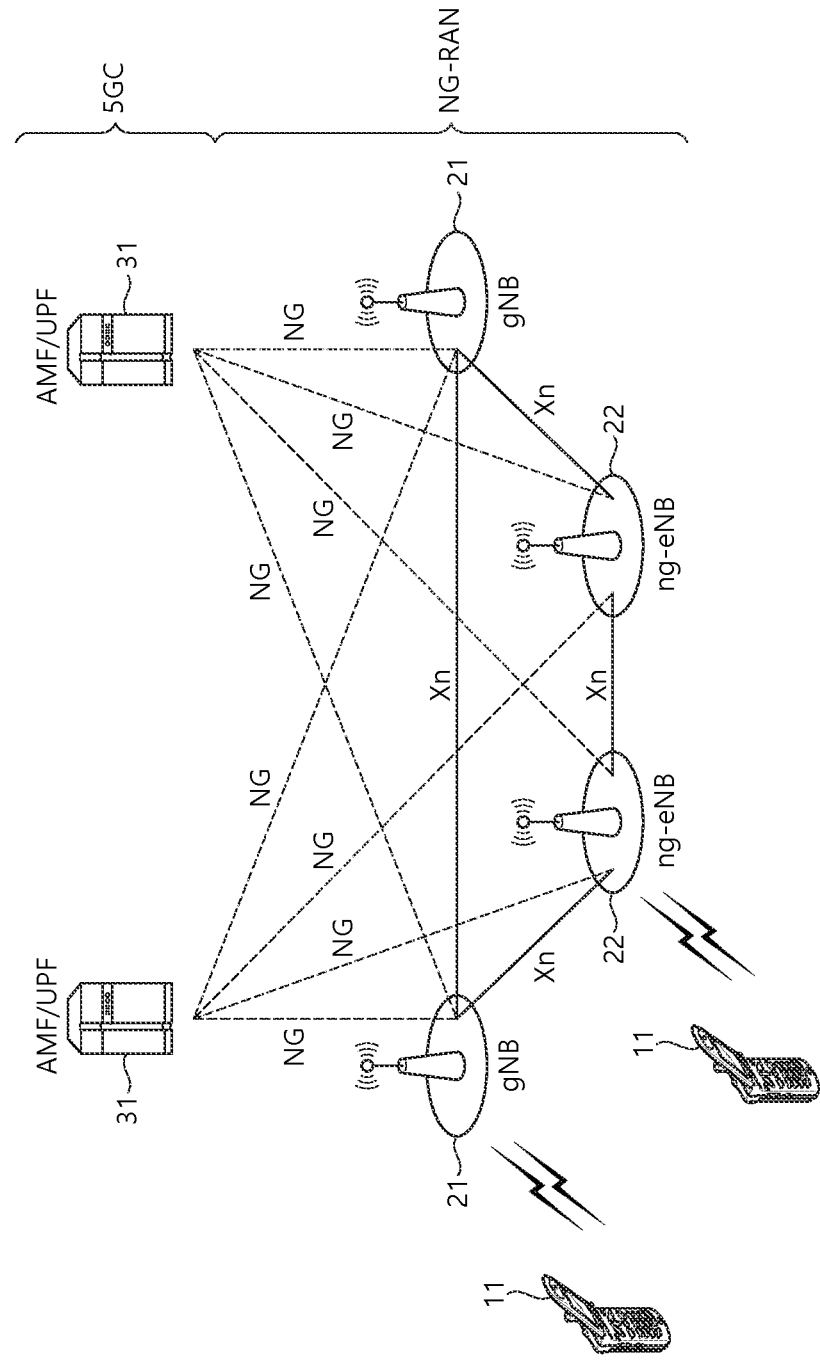
FIG. 2 shows another example of a wireless communication system to which technical features of the present invention can be applied.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW.

The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A structure of a radio frame in NR is described. In LTE/LTE-A, one radio frame consists of 10 subframes, and one subframe consists of 2 slots. A length of one subframe may be 1 ms, and a length of one slot may be 0.5 ms. Time for transmitting one transport block by higher layer to physical layer (generally over one subframe) is defined as a transmission time interval (TTI). A TTI may be the minimum unit of scheduling.

Unlike LTE/LTE-A, NR supports various numerologies, and accordingly, the structure of the radio frame may be varied. NR supports multiple subcarrier spacings in frequency domain. Table 1 shows multiple numerologies supported in NR. Each numerology may be identified by index $\mu$.

TABLE 1

| $\mu$ | Subcarrier spacing (kHz) | Cyclic prefix | Supported for data | Supported for synchronization |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Referring to Table 1, a subcarrier spacing may be set to any one of 15, 30, 60, 120, and 240 kHz, which is identified by index $\mu$. However, subcarrier spacings shown in Table 1 are merely exemplary, and specific subcarrier spacings may be changed. Therefore, each subcarrier spacing (e.g. $\mu$=0, 1 . . . 4) may be represented as a first subcarrier spacing, a second subcarrier spacing . . . Nth subcarrier spacing.

Referring to Table 1, transmission of user data (e.g. physical uplink shared channel (PUSCH), physical downlink shared channel (PDSCH)) may not be supported depending on the subcarrier spacing. That is, transmission of user data may not be supported only in at least one specific subcarrier spacing (e.g. 240 kHz).

In addition, referring to Table 1, a synchronization channel (e.g. a primary synchronization signal (PSS), a secondary synchronization signal (SSS), a physical broadcast channel (PBCH)) may not be supported depending on the subcarrier spacing. That is, the synchronization channel may not be supported only in at least one specific subcarrier spacing (e.g. 60 kHz).

In NR, a number of slots and a number of symbols included in one radio frame/subframe may be different according to various numerologies, i.e. various subcarrier spacings. Table 2 shows an example of a number of OFDM symbols per slot, slots per radio frame, and slots per subframe for normal cyclic prefix (CP).

TABLE 2

| $\mu$ | Number of symbols per slot | Number of slots per radio frame | Number of slots per subframe |
|---|---|---|---|
| 0 | 14 | 10 | 1 |
| 1 | 14 | 20 | 2 |
| 2 | 14 | 40 | 4 |

TABLE 2-continued

| $\mu$ | Number of symbols per slot | Number of slots per radio frame | Number of slots per subframe |
|---|---|---|---|
| 3 | 14 | 80 | 8 |
| 4 | 14 | 160 | 16 |

Referring to Table 2, when a first numerology corresponding to $\mu$=0 is applied, one radio frame includes 10 subframes, one subframe corresponds to one slot, and one slot consists of 14 symbols. In the present specification, a symbol refers to a signal transmitted during a specific time interval. For example, a symbol may refer to a signal generated by OFDM processing. That is, a symbols in the present specification may refer to an OFDM/OFDMA symbol, or SC-FDMA symbol, etc. A CP may be located between each symbol.

Figure 3:
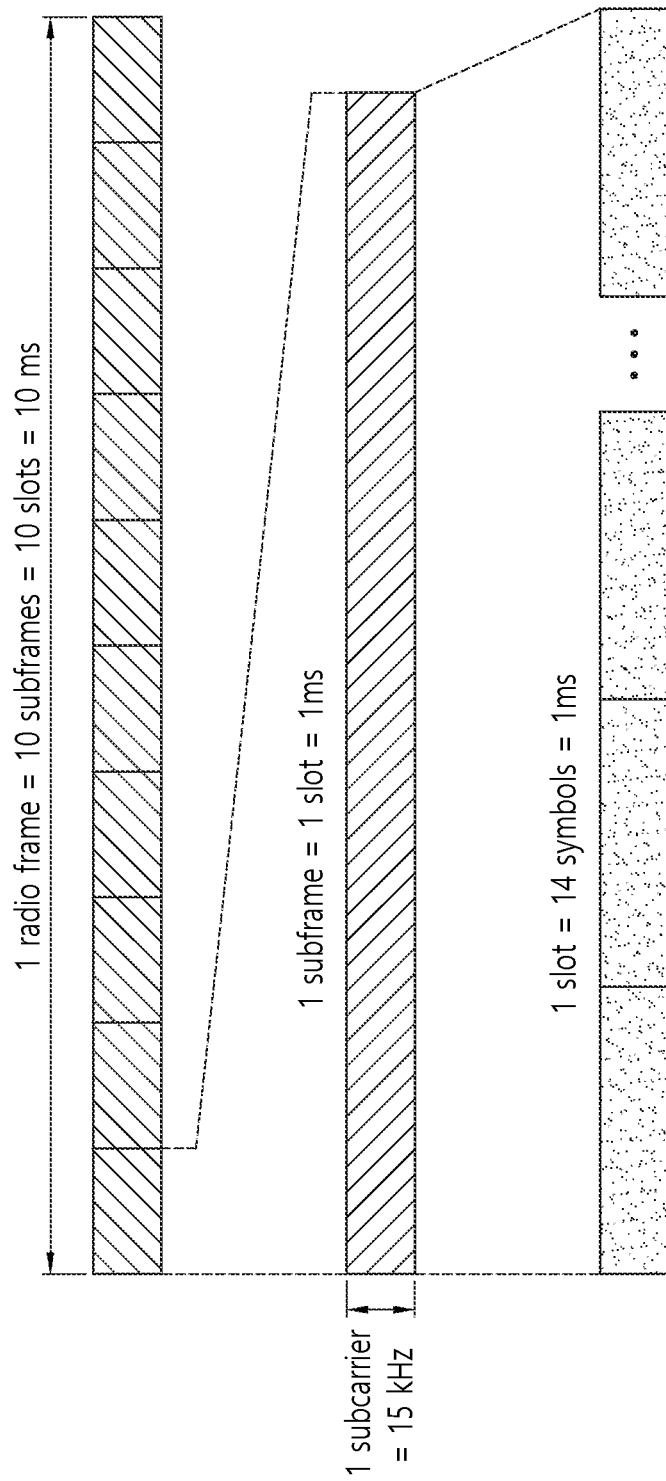
FIG. 3 shows an example of a frame structure to which technical features of the present invention can be applied.

FIG. 3 shows an example of a frame structure to which technical features of the present invention can be applied. In FIG. 3, a subcarrier spacing is 15 kHz, which corresponds to $\mu$=0.

Figure 4:
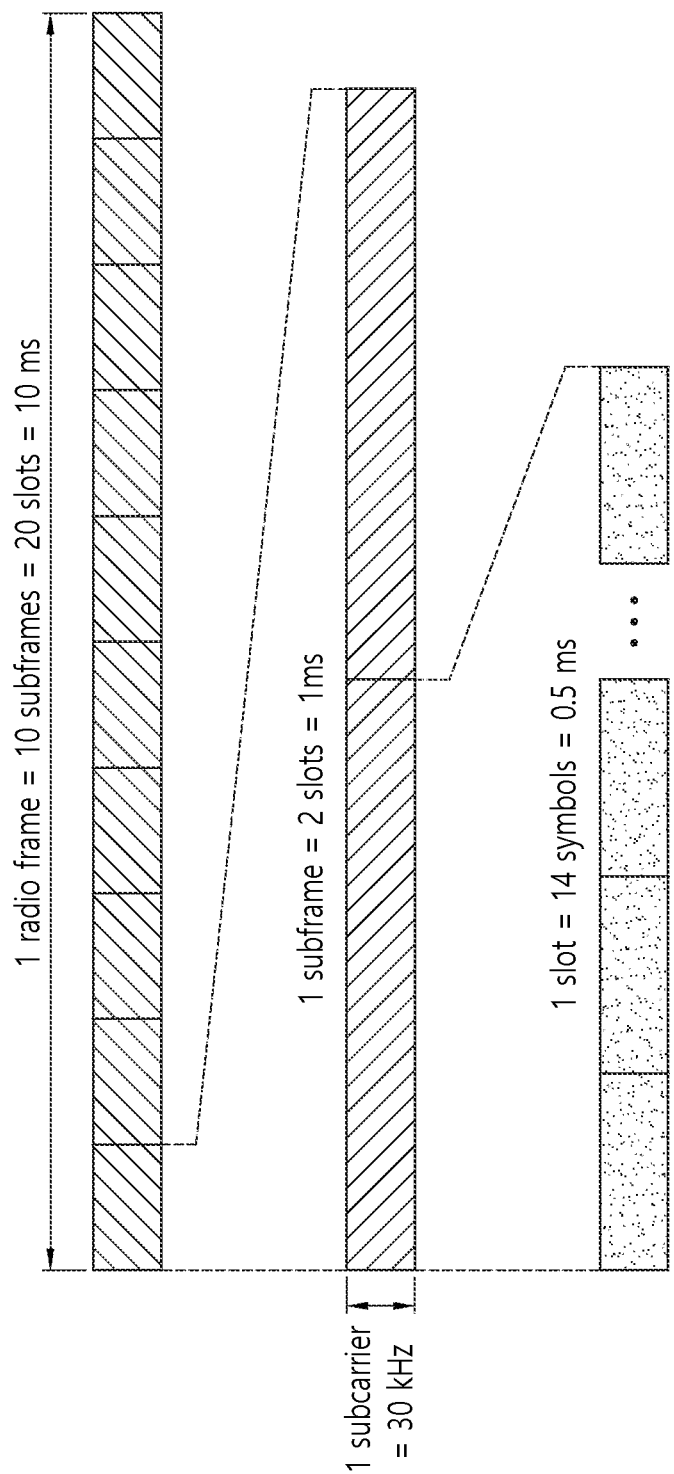
FIG. 4 shows another example of a frame structure to which technical features of the present invention can be applied.

FIG. 4 shows another example of a frame structure to which technical features of the present invention can be applied. In FIG. 4, a subcarrier spacing is 30 kHz, which corresponds to $\mu$=1.

Table 3 shows an example of a number of OFDM symbols per slot, slots per radio frame, and slots per subframe for extended CP.

TABLE 3

| $\mu$ | Number of symbols per slot | Number of slots per radio frame | Number of slots per subframe |
|---|---|---|---|
| 2 | 12 | 40 | 4 |

Meanwhile, a frequency division duplex (FDD) and/or a time division duplex (TDD) may be applied to a wireless system to which an embodiment of the present invention is applied. When TDD is applied, in LTE/LTE-A, UL subframes and DL subframes are allocated in units of subframes.

In NR, symbols in a slot may be classified as a DL symbol (denoted by D), a flexible symbol (denoted by X), and a UL symbol (denoted by U). In a slot in a DL frame, the UE shall assume that DL transmissions only occur in DL symbols or flexible symbols. In a slot in an UL frame, the UE shall only transmit in UL symbols or flexible symbols.

Table 4 shows an example of a slot format which is identified by a corresponding format index. The contents of the Table 4 may be commonly applied to a specific cell, or may be commonly applied to adjacent cells, or may be applied individually or differently to each UE.

TABLE 4

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | X | X | X | X | X | X |
| 8 | X | X | X | X | X | X | X | X | X | X | X | X | X | U |
| 9 | X | X | X | X | X | X | X | X | X | X | X | X | U | U |

TABLE 4-continued

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| ... | ... | ... | ... | ... | ... | ... | ... | ... | ... | ... | ... | ... | ... | ... |

For convenience of explanation, Table 4 shows only a part of the slot format actually defined in NR. The specific allocation scheme may be changed or added.

The UE may receive a slot format configuration via a higher layer signaling (i.e. radio resource control (RRC) signaling). Or, the UE may receive a slot format configuration via downlink control information (DCI) which is received on PDCCH. Or, the UE may receive a slot format configuration via combination of higher layer signaling and DCI.

Figure 5:
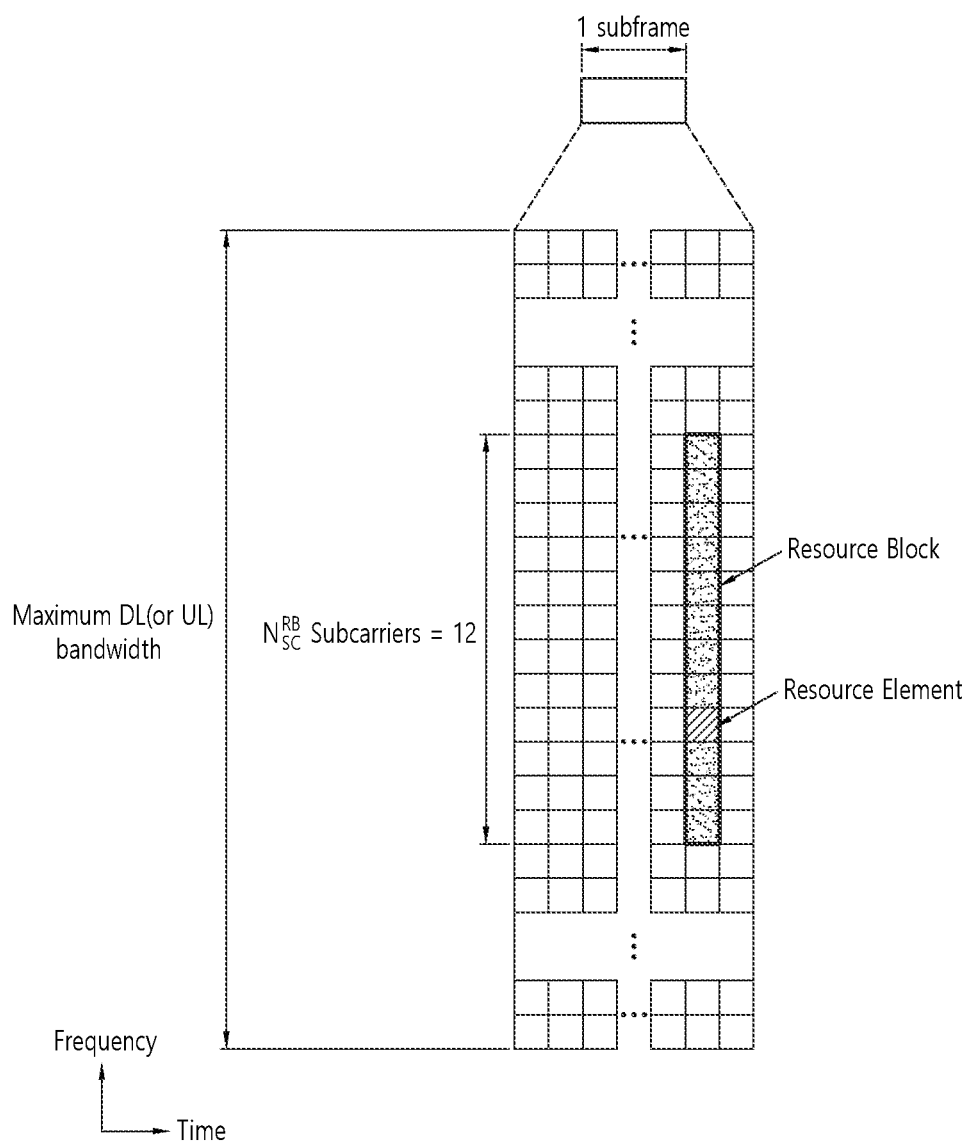
FIG. 5 shows an example of a resource grid to which technical features of the present invention can be applied.

FIG. 5 shows an example of a resource grid to which technical features of the present invention can be applied. An example shown in FIG. 5 is a time-frequency resource grid used in NR. An example shown in FIG. 5 may be applied to UL and/or DL. Referring to FIG. 5, multiple slots are included within one subframe on the time domain. Specifically, when expressed according to the value of "μ", "14~2μ" symbols may be expressed in the resource grid. Also, one resource block (RB) may occupy 12 consecutive subcarriers. One RB may be referred to as a physical resource block (PRB), and 12 resource elements (REs) may be included in each PRB. The number of allocatable RBs may be determined based on a minimum value and a maximum value. The number of allocatable RBs may be configured individually according to the numerology ("μ"). The number of allocatable RBs may be configured to the same value for UL and DL, or may be configured to different values for UL and DL.

A cell search scheme in NR is described. The UE may perform cell search in order to acquire time and/or frequency synchronization with a cell and to acquire a cell identifier (ID). Synchronization channels such as PSS, SSS, and PBCH may be used for cell search.

Figure 6:
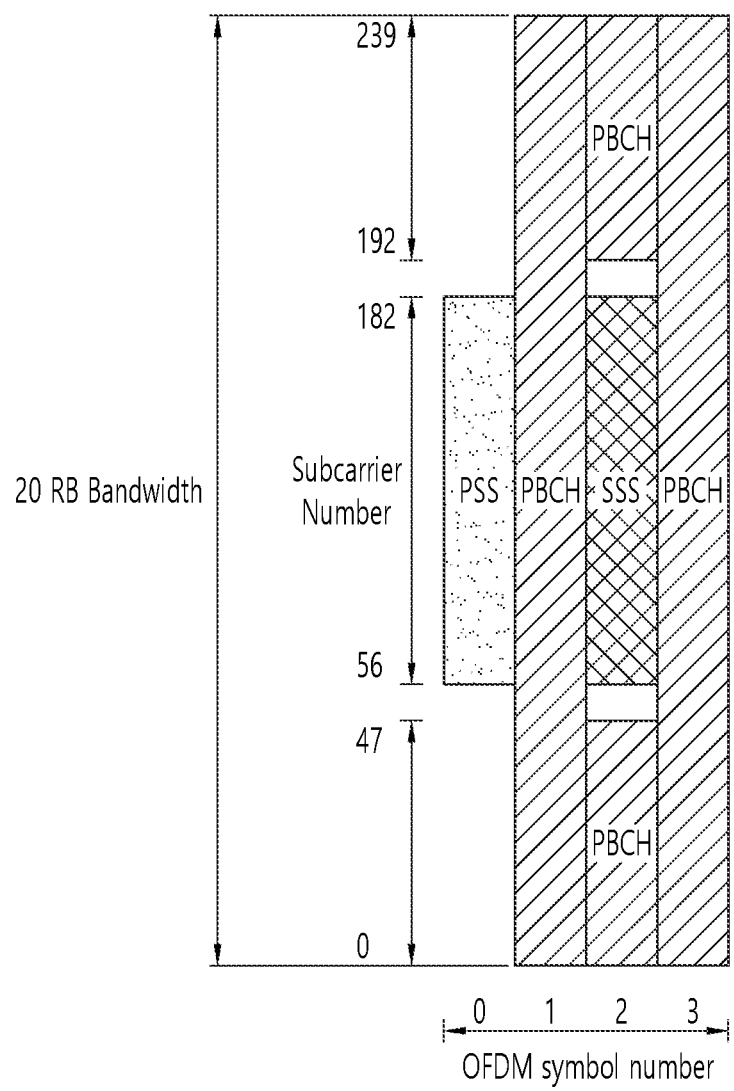
FIG. 6 shows an example of a synchronization channel to which technical features of the present invention can be applied.

FIG. 6 shows an example of a synchronization channel to which technical features of the present invention can be applied. Referring to FIG. 6, the PSS and SSS may include one symbol and 127 subcarriers. The PBCH may include 3 symbols and 240 subcarriers.

The PSS is used for synchronization signal/PBCH block (SSB) symbol timing acquisition. The PSS indicates 3 hypotheses for cell ID identification. The SSS is used for cell ID identification. The SSS indicates 336 hypotheses. Consequently, 1008 physical layer cell IDs may be configured by the PSS and the SSS.

The SSB block may be repeatedly transmitted according to a predetermined pattern within the 5 ms window. For example, when L SSB blocks are transmitted, all of SSB #1 through SSB #L may contain the same information, but may be transmitted through beams in different directions. That is, quasi co-located (QCL) relationship may not be applied to the SSB blocks within the 5 ms window. The beams used to receive the SSB block may be used in subsequent operations between the UE and the network (e.g. random access operations). The SSB block may be repeated by a specific period. The repetition period may be configured individually according to the numerology.

Referring to FIG. 6, the PBCH has a bandwidth of 20 RBs for the 2nd/4th symbols and 8 RBs for the 3rd symbol. The PBCH includes a demodulation reference signal (DM-RS) for decoding the PBCH. The frequency domain for the DM-RS is determined according to the cell ID. Unlike LTE/LTE-A, since a cell-specific reference signal (CRS) is not defined in NR, a special DM-RS is defined for decoding the PBCH (i.e. PBCH-DMRS). The PBCH-DMRS may contain information indicating an SSB index.

The PBCH performs various functions. For example, the PBCH may perform a function of broadcasting a master information block (MIB). System information (SI) is divided into a minimum SI and other SI. The minimum SI may be divided into MIB and system information block type-1 (SIB1). The minimum SI excluding the MIB may be referred to as a remaining minimum SI (RMSI). That is, the RMSI may refer to the SIB1.

The MIB includes information necessary for decoding SIB1. For example, the MIB may include information on a subcarrier spacing applied to SIB1 (and MSG 2/4 used in the random access procedure, other SI), information on a frequency offset between the SSB block and the subsequently transmitted RB, information on a bandwidth of the PDCCH/SIB, and information for decoding the PDCCH (e.g. information on search-space/control resource set (CORESET)/DM-RS, etc., which will be described later). The MIB may be periodically transmitted, and the same information may be repeatedly transmitted during 80 ms time interval. The SIB1 may be repeatedly transmitted through the PDSCH. The SIB1 includes control information for initial access of the UE and information for decoding another SIB.

PDCCH decoding in NR is described. The search space for the PDCCH corresponds to an area in which the UE performs blind decoding on the PDCCH. In LTE/LTE-A, the search space for the PDCCH is divided into a common search space (CSS) and a UE-specific search space (USS). The size of each search space and/or the size of a control channel element (CCE) included in the PDCCH are determined according to the PDCCH format.

In NR, a resource-element group (REG) and a CCE for the PDCCH are defined. In NR, the concept of CORESET is defined. Specifically, one REG corresponds to 12 REs, i.e. one RB transmitted through one OFDM symbol. Each REG includes a DM-RS. One CCE includes a plurality of REGs (e.g. 6 REGs). The PDCCH may be transmitted through a resource consisting of 1, 2, 4, 8, or 16 CCEs. The number of CCEs may be determined according to the aggregation level. That is, one CCE when the aggregation level is 1, 2 CCEs when the aggregation level is 2, 4 CCEs when the aggregation level is 4, 8 CCEs when the aggregation level is 8, 16 CCEs when the aggregation level is 16, may be included in the PDCCH for a specific UE.

The CORESET may be defined on 1/2/3 OFDM symbols and multiple RBs. In LTE/LTE-A, the number of symbols used for the PDCCH is defined by a physical control format indicator channel (PCFICH). However, the PCFICH is not used in NR. Instead, the number of symbols used for the COREST may be defined by the RRC message (and/or PBCH/SIB1). Also, in LTE/LTE-A, since the frequency bandwidth of the PDCCH is the same as the entire system bandwidth, so there is no signaling regarding the frequency bandwidth of the PDCCH. In NR, the frequency domain of the CORESET may be defined by the RRC message (and/or PBCH/SIB1) in a unit of RB.

In NR, the search space for the PDCCH is divided into CSS and USS. Since the USS may be indicated by the RRC message, an RRC connection may be required for the UE to decode the USS. The USS may include control information for PDSCH decoding assigned to the UE.

Since the PDCCH needs to be decoded even when the RRC configuration is not completed, CSS should also be defined. For example, CSS may be defined when a PDCCH for decoding a PDSCH that conveys SIB1 is configured or when a PDCCH for receiving MSG 2/4 is configured in a random access procedure. Like LTE/LTE-A, in NR, the PDCCH may be scrambled by a radio network temporary identifier (RNTI) for a specific purpose.

A resource allocation scheme in NR is described. In NR, a specific number (e.g. up to 4) of bandwidth parts (BPWs) may be defined. A BWP (or carrier BWP) is a set of consecutive PRBs, and may be represented by a consecutive subsets of common RBs (CRBs). Each RB in the CRB may be represented by CRB1, CRB2, etc., beginning with CRB0.

Figure 7:
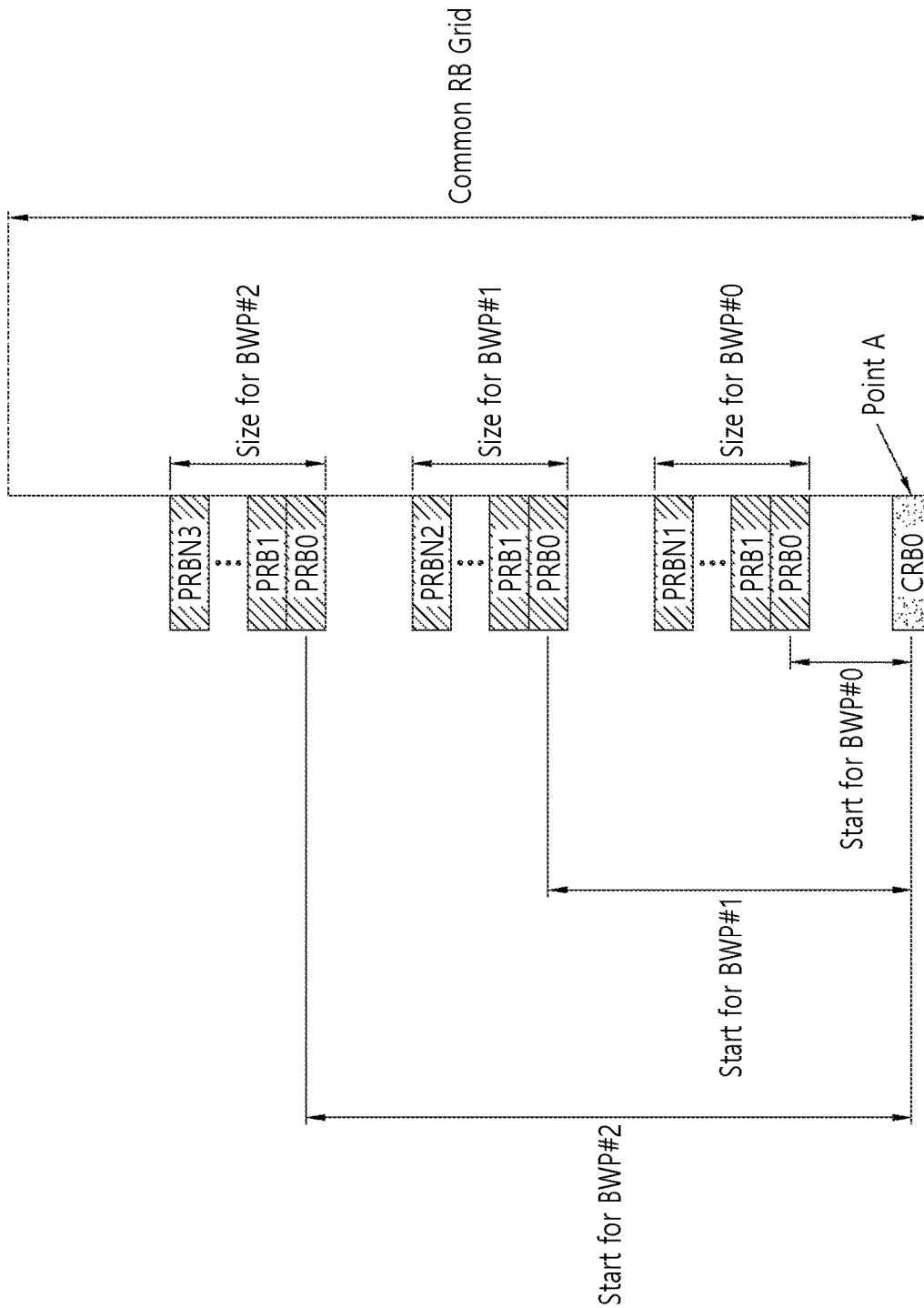
FIG. 7 shows an example of a frequency allocation scheme to which technical features of the present invention can be applied.

FIG. 7 shows an example of a frequency allocation scheme to which technical features of the present invention can be applied. Referring to FIG. 7, multiple BWPs may be defined in the CRB grid. A reference point of the CRB grid (which may be referred to as a common reference point, a starting point, etc.) is referred to as so-called "point A" in NR. The point A is indicated by the RMSI (i.e. SIB1). Specifically, the frequency offset between the frequency band in which the SSB block is transmitted and the point A may be indicated through the RMSI. The point A corresponds to the center frequency of the CRB0. Further, the point A may be a point at which the variable "k" indicating the frequency band of the RE is set to zero in NR. The multiple BWPs shown in FIG. 7 is configured to one cell (e.g. primary cell (PCell)). A plurality of BWPs may be configured for each cell individually or commonly.

Referring to FIG. 7, each BWP may be defined by a size and starting point from CRB0. For example, the first BWP, i.e. BWP #0, may be defined by a starting point through an offset from CRB0, and a size of the BWP #0 may be determined through the size for BWP #0.

A specific number (e.g., up to four) of BWPs may be configured for the UE. At a specific time point, only a specific number (e.g. one) of BWPs may be active per cell. The number of configurable BWPs or the number of activated BWPs may be configured commonly or individually for UL and DL. The UE can receive PDSCH, PDCCH and/or channel state information (CSI) RS only on the active DL BWP. Also, the UE can transmit PUSCH and/or physical uplink control channel (PUCCH) only on the active UL BWP.

Figure 8:
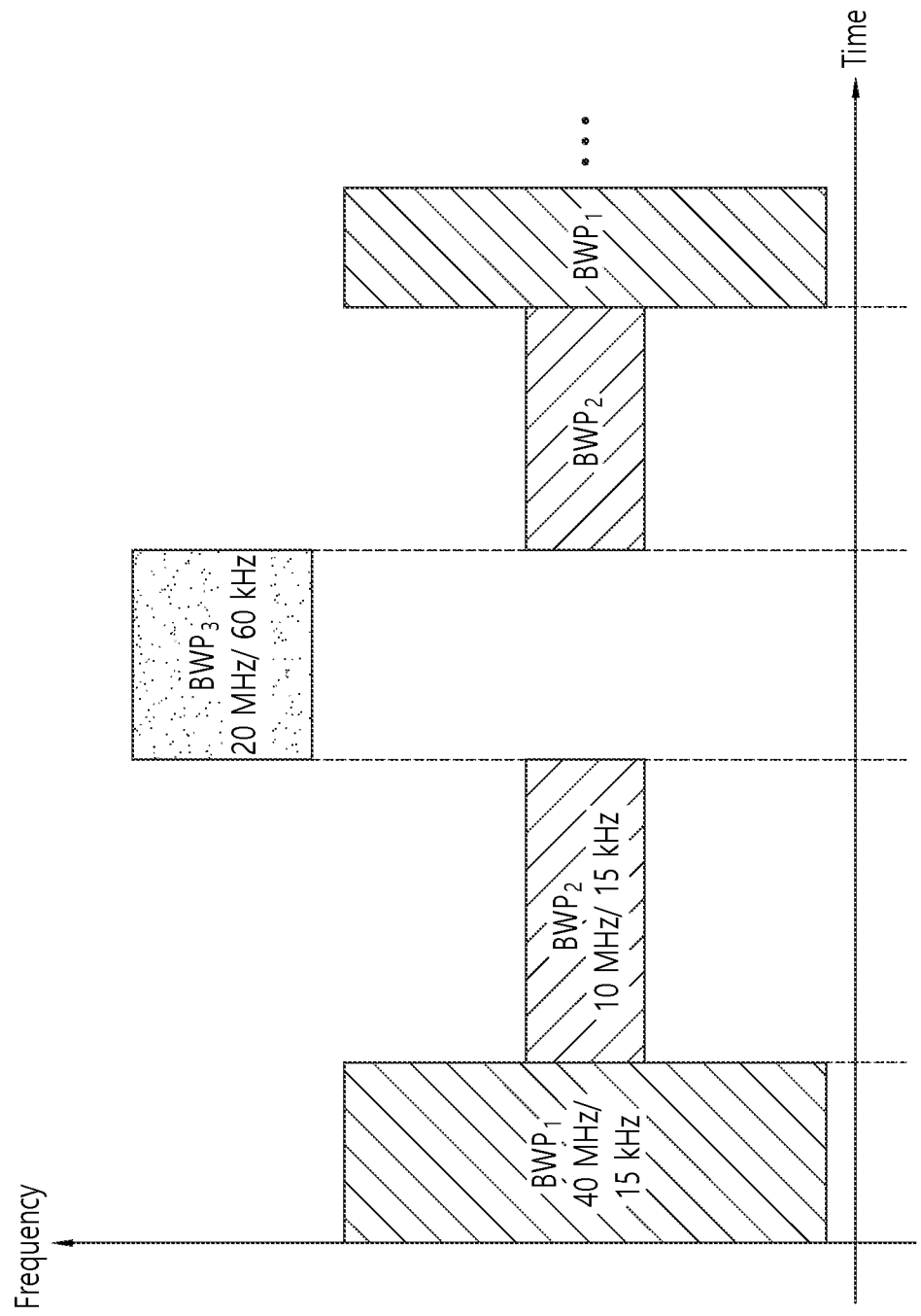
FIG. 8 shows an example of multiple BWPs to which technical features of the present invention can be applied.

FIG. 8 shows an example of multiple BWPs to which technical features of the present invention can be applied. Referring to FIG. 8, 3 BWPs may be configured. The first BWP may span 40 MHz band, and a subcarrier spacing of 15 kHz may be applied. The second BWP may span 10 MHz band, and a subcarrier spacing of 15 kHz may be applied. The third BWP may span 20 MHz band and a subcarrier spacing of 60 kHz may be applied. The UE may configure at least one BWP among the 3 BWPs as an active BWP, and may perform UL and/or DL data communication via the active BWP.

A time resource may be indicated in a manner that indicates a time difference/offset based on a transmission time point of a PDCCH allocating DL or UL resources. For example, the start point of the PDSCH/PUSCH corresponding to the PDCCH and the number of symbols occupied by the PDSCH/PUSCH may be indicated.

Carrier aggregation (CA) is described. Like LTE/LTE-A, CA can be supported in NR. That is, it is possible to aggregate continuous or discontinuous component carriers (CCs) to increase the bandwidth and consequently increase the bit rate. Each CC may correspond to a (serving) cell, and each CC/cell may be divided into a primary serving cell (PSC)/primary CC (PCC) or a secondary serving cell (SSC)/ secondary CC (SCC).

Hereinafter, various aspects of the present invention is described according to embodiments of the present invention.

1. Differentiation Between Mini-Slot and Slot

As mentioned above, a slot is a basic unit for scheduling in NR. Furthermore, a mini-slot may be defined. The mini-slot may be a supplemental unit for scheduling. A length of the mini-slot is shorter than a length of the slot. The slot may include multiple mini-slots.

Properties of the slot based scheduling and the mini-slot based scheduling may be different. Firstly, the duration of mini-slot based scheduling may not exceed the duration of slot, unless mini-slot aggregation is also supported. To support longer duration than the slot, multi-slot with variable start and end positions in each slot may be utilized, instead of mini-slot aggregation. Furthermore, the scheduling DCI may be present at any time during the slot. In other words, scheduling DCI may be transmitted from a CORESET placed in the first OFDM symbols of the slot, or scheduling DCI may be transmitted from a CORESET placed in the middle or last part of the slot. Furthermore, the location of demodulation reference signal (DM-RS) and its selectable patterns may also be different between mini-slot based scheduling and slot based scheduling. Also, resource allocation in multi-mini-slot based scheduling may be contiguous, whereas resource allocation in multi-slot based scheduling may be discontinuous due to gap or UL resources between slots. As at least time-domain resources or resource allocation may be different between mini-slot based scheduling and slot-based scheduling, a UE may need to differentiate mini-slot based scheduling and slot based scheduling.

The followings are approaches to differentiate mini-slot based scheduling and slot based scheduling and interpret the associated resource allocation fields.

(1) Implicit differentiation: Only slot based scheduling may be scheduled in a CORESET. A monitoring periodicity of the CORESET/search space set may be multiple of slots. Or, location of the CORESET/search space set may be in the first few OFDM symbols. Or, the end OFDM symbol of the CORESET may be before the first OFDM symbol of indicated DM-RS position for data transmission. Alternatively, CORESET/search space set may schedule only slot based scheduling, unless indicated otherwise. In other words, default behaviour of a CORESET/search space set may be to schedule a slot based scheduling. The slot based scheduling may also include multi-slot based scheduling. The slot based scheduling may be overwritten by explicit configuration. When slot based scheduling is supported, the multi-slot based scheduling may be supported with semi-statically fixed value and dynamically indicated number of slots.

(2) Explicit configuration per each CORESET or per each search space set or per each DCI format or per each DCI size in a CORESET: A set of start and end positions of PDSCH and PUSCH, respectively, may be explicitly configured. The set of start and end positions of PDSCH and PUSCH may be configured per CORESET or per each search space set or per each DCI format or per each DCI size. In each CORESET or per DCI format, a set of patterns which may be indicated in time-domain resource allocation field may be configured. For example, Table 5 shows an example of configuration for PDSCH scheduling.

TABLE 5

| Index | Number of slot | Start-End OFDM symbol |
|---|---|---|
| 1 | 1 | $1^{st}$ OFDM symbol-end of DL-centric |
| 2 | 1 | $1^{st}$ OFDM symbol-end of slot |
| 3 | 2 | $1^{st}$ OFDM symbol-end of DL centric in first slot, first DM-RS OFDM symbol-end of slot in second slot |
| 4 | 2 | $1^{st}$ OFDM symbol-end of DL centric in first slot, $1^{st}$ OFDM symbol-end of slot in second slot |
| 5 | 2 | $1^{st}$ OFDM symbol-end of slot in first slot, $1^{st}$ OFDM symbol-end of slot in second slot |
| 6 | 2 | $1^{st}$ OFDM symbol-end of slot in first slot, first DM-RS OFDM symbol-end of DL centric in second slot |
| 7 | 4 | DL portion indicated in slot format indicator index 1 |
| 8 | 4 | DL portion indicated in slot format indicator index 5 |

When this is configured to a CORESET, DCI from the CORESET may indicate 1, 2 or 4 slot aggregations starting from the same slot where the DCI is transmitted. Alternatively, additional offset in terms of slot may be indicated to support cross-slot scheduling and multi-slot aggregation. To also support cross-slot scheduling, cross-slot scheduling may be also indicated as one of pattern for data mapping. Or, separate field may be used for cross-slot scheduling. Alternatively, either cross-slot or multi-slot aggregation may be used where different entries may be applied depending on cross-slot or multi-slot scheduling. In the configuration, the field size for time-domain resource allocation may be implicitly indicated, depending on the number of entries in the configured table. Or, the field size for time-domain resource allocation may be explicitly indicated. If the number is smaller than the number of entries in the configured table, the first entries indictable by the field may be used.

Multi-slot based scheduling and cross-slot based scheduling is described. As mentioned above, multi-slot based scheduling or cross-slot based scheduling may be indicated by at least one of the following options.

(1) Explicit indication of start OFDM symbol and/or end OFDM symbol in each slot: Maximum number of slots which is schedulable may be configured, and the maximum number of slots may define the field size. Also, the number of possible candidates in each slot may be predefined or higher layer configured. If the number of possible candidates is K, log 2K bits are necessary for each slot. Therefore, the field size may become log 2K*m, where m is the maximum number of slots indictable by cross-slot based scheduling or multi-slot based scheduling. Cross-slot based scheduling and multi-slot based scheduling may utilize the unified field, and for cross-slot scheduling, one entry in each slot may be set as NULL. Alternatively, for cross slot based scheduling, offset field may be separately used or one slot indication (e.g. current slot indication) may be used for the offset of slot.

When mini-slot based scheduling is used, similar mechanism may be used. Alternatively, when mini-slot based scheduling is used, indication of start OFDM symbol within a slot and duration may be indicated by resource allocation mechanism of contiguous time-domain resource. Or, the number of multi-mini-slots may be explicitly indicated, as a separate field with start+duration for mini-slot based scheduling is indicated by contiguous time-domain resource allocation. For multi-mini-slot based scheduling, the same size of data duration may be used over multiple mini-slots contiguously. Alternatively, another approach for indicating cross-slot based scheduling and multi-slot based scheduling is to indicate slot number, which can be used for cross-slot based scheduling, the offset between PDCCH and PDSCH (or PUSCH), the number of slot aggregation for multi-slot based scheduling, and time-domain resource allocation in a slot. In case of cross-slot based scheduling, only one slot may be scheduled, and in case of multi-slot based scheduling, time-domain resource allocation may be repeated.

(2) DCI field for cross-slot based scheduling and multi-slot based scheduling may be different. The DCI field for cross-slot based scheduling may include an offset to start cross-slot scheduling data, and time-domain resource allocation which may be restricted only to a slot. In case of multi-slot based scheduling, different resource allocation mechanisms mentioned above may be used.

Table 6 shows options for DCI field for multi-slot based scheduling and cross-slot based scheduling.

TABLE 6

| Size of DCI field | Same-slot & single slot | Cross-slot & single slot | Multi-slot & starting in the same slot | Cross-slot & multi-slot |
|---|---|---|---|---|
| Ceil (log$_2$K) * m(e.g. m = 4, K = 5) | Unused slots can be indicated with NULL e.g. [2 1 1 1] ($1^{st}$ slot scheduling with DwPTS length) | Unused slots can be indicated with NULL e.g. [1 1 3 1] ($3^{rd}$ slot scheduling with full DL) | Unused slots can be indicated with NULL e.g. [2 4 5 5] (4 slot aggregation with excluding data mapping at control region in non-scheduled slots) | Unused slots can be indicated with NULL e.g. [1 1 3 4] ($3^{rd}$ & $4^{th}$ slot scheduling with full DLs) |
| Ceil (log$_2$K * m)(every K states are used for each slot) -> similar to the above approach with reduced number of bits | Unused slots can be indicated with NULL | Unused slots can be indicated with NULL | Unused slots can be indicated with NULL | Unused slots can be indicated with NULL |

TABLE 6-continued

| Size of DCI field | Same-slot & single slot | Cross-slot & single slot | Multi-slot & starting in the same slot | Cross-slot & multi-slot |
|---|---|---|---|---|
| Ceil (log$_2$m) + ceil (log$_2$K) -> Assume time-domain resource is repeated over multiple slots | Number of slot = 1, time domain resource can be one from K entries e.g. [1] + [3] | Number of slot = offset to PDSCH, time domain resource in the slot e.g. [2] + [3] (2$^{nd}$ slot scheduled with full DL) | Number of slot = aggregated slot #, time domain resource repeated over aggregated slots e.g. [3] + [5] (3 slots aggregation with DwPTS mapping) | Not supported |
| Field indicated between same, cross-slot, multi-slot scheduling + separate field (DCI field size can vary) | Only time-domain resource for a slot | Time-offset + one-slot time-domain RA | Time-domain resource allocation of multiple slots + number of slots aggregated (may be implicit) | Offset + time-domain resource allocation of multiple slots + number of slots aggregated (may be implicit) |
| Index from a table which includes entries of same-slot, cross-slot, multi-slot scheduling with data durations | Index from a table | Index from a table | Index from a table | Index from a table |

Table 7 shows examples of K entries in each slot scheduling for PDSCH.

TABLE 7

1 NULL
2 1$^{st}$ symbol-end of DL centric slot (the end symbol of DL centric slot is indicated to the UE by configuring UpPTS region + UE-specific gap
3 1$^{st}$ symbol-end of slot
4 Next symbol to the first DM-RS (or same symbol to DM-RS if data/DM-RS multiplexing is allowed)-end of slot
5 Next symbol to the first DM-RS (or same symbol to DM-RS if data/DM-RS multiplexing is allowed)-end of DwPTS For the fifth approach mentioned above in Table 6, i.e. index from a table which includes entries of same-slot, cross-slot, multi-slot scheduling with data durations is used, the table should be defined. Table 8 shows an example of the table including entries of same-slot, cross-slot, multi-slot scheduling with data durations.

TABLE 8

| Index | Number of slot | Start slot index | Start-End OFDM symbol |
|---|---|---|---|
| 1 | 1 | Same as PDCCH | 1$^{st}$ OFDM symbol-end of DL-centric |
| 2 | 1 | Same as PDCCH | 1$^{st}$ OFDM symbol-end of slot |
| 3 | 2 | Same as PDCCH | 1$^{st}$ OFDM symbol-end of DL centric in first slot, DM-RS OFDM symbol-end of slot in second slot |
| 4 | 2 | Same as PDCCH | 1$^{st}$ OFDM symbol-end of DL centric in first slot, 1$^{st}$ OFDM symbol-end of slot in second slot |
| 5 | 2 | Same as PDCCH | 1$^{st}$ OFDM symbol-end of slot in first slot, 1$^{st}$ OFDM symbol-end of slot in second slot |
| 6 | 2 | Same as PDCCH | 1$^{st}$ OFDM symbol-end of slot in first slot, first DM-RS OFDM symbol-end of DL centric in second slot |
| 7 | 4 | Same as PDCCH | DL portion indicated in slot format indicator index 1 |
| 8 | 4 | Same as PDCCH | DL portion indicated in slot format indicator index 5 |
| 9 | 1 | In the next slot | 1st OFDM symbol-end of DL-centric |
| 10 | 1 | In the next slot | 1$^{st}$ OFDM symbol-end of slot |
| 11 | 1 | In 2 slots afterwards | 1st OFDM symbol-end of DL-centric |
| 12 | 1 | In 2 slots afterwards | 1$^{st}$ OFDM symbol-end of slot |
| 13 | 2 | In the next slot | 1$^{st}$ OFDM symbol-end of slot in first slot, 1$^{st}$ OFDM symbol-end of slot in second slot |
| 14 | 2 | In the next slot | 1$^{st}$ OFDM symbol-end of slot in first slot, first DM-RS OFDM symbol-end of DL centric in second slot |
| 15 | 4 | In the next slot | DL portion indicated in slot format indicator index 1 |
| 16 | 4 | In the next slot | DL portion indicated in slot format indicator index 5 |

Referring to Table 8, number of slots, start slot index and/or start-end OFDM symbol are indicated by the index. Even though it is described that all of number of slots, start slot index and/or start-end OFDM symbol are indicated by the index in Table 8, at least one of combination of number of slots, start slot index and/or start-end OFDM symbol may be indicated by the index. The index may be provided by the time domain resource assignment field of the DCI.

Furthermore, similar mechanism may be also applied to PUSCH. Only difference is that default offset may be added to the table in PUSCH scheduling. The default offset may be configured by higher layer for slot based scheduling. For example, if the default offset is configured as 1 slot, actual scheduling may occur in the slot indicated by DCI+1 slot. For PDSCH, the default offset may be zero. If there is no configuration for UL, the default offset may be zero.

2. Cross-BWP Scheduling/Cross-Carrier Scheduling

When cross-BWP or cross-carrier scheduling is used, for determining of timing to start and end for PDSCH or PUSCH, the following approaches may be considered.

(1) Start position and end position for PDSCH or PUSCH indicated in DCI field may be interpreted based on the slot for PDSCH or PUSCH. In this case, it may be assumed that start slot overlaps with the (first or entire or last) OFDM symbol(s) scheduling DCI. Or, it may be assumed that the first slot overlaps with a slot in the scheduling carrier containing scheduling DCI. The start slot may be the slot of PDSCH or PUSCH that overlaps with the first OFDM symbol of PDCCH. Or, the start slot may be the slot of PDSCH or PUSCH that overlaps with the CORESET transmitting scheduling DCI. Or, the next slot of a slot which overlaps with the first OFDM symbol of scheduling DCI or PDCCH may be the first slot for data scheduling. Alternatively, the slot which overlaps with the last OFDM symbol of PDCCH or CORESET may be as the first slot for data scheduling.

(2) Start position and end position for PDSCH or PUSCH may be explicitly configured/indicated. Similar to start position indication of PDSCH scheduling in LTE, the start position in OFDM symbol or slot may be indicated. The offset may be applied to the start OFDM symbol or start slot which is determined by the overlapping with first or end of PDCCH containing DCI.

When cross-BWP scheduling or cross-carrier scheduling is used, for determining start OFDM symbol, if start OFDM symbol starts relative to the start of the slot, it is necessary to determine the slot where start offset is applied. Start slot may be defined as mentioned above. If there are two slots which overlap with start or end of control OFDM symbol (e.g. 15 kHz OFDM symbol and 120 kHz slot), either the first or second slot may be selected. Or, the slot with more overlapping portion may be selected. If start offset is applied at the OFDM symbol of control channel (e.g. mini-slot based scheduling), the last or first OFDM symbol of a carrier or BWP where PDSCH or PUSCH is scheduled to the control channel OFDM symbol may be used for the reference.

When cross-carrier scheduling or cross-BWP scheduling is used, the rate matching pattern indication still may be used and the rate matching pattern may be applied to the scheduled BWP or carrier. In this case, as the UE may not be configured with CORESET in the scheduled BWP/carrier, the rate matching pattern may include the duration or the duration (possibly also the start OFDM symbol) for CORESETs may be also configured.

Cross-carrier scheduling may be configured per CORESET or per search space. For each CORESET or for each search space set configuration, cross-carrier scheduling may be enabled or disabled for a carrier. Alternatively, cross-carrier scheduling may be configured per RNTI. If cross-carrier scheduling configured per RNTI, all scheduling, e.g. for C-RNTI on a carrier, may be cross-carrier scheduled by another carrier.

In scheduling PUSCH, even with slot based scheduling, the start position may be determined as follows even with self-carrier or self-BWP scheduling.

(1) If PUSCH starts in the same slot where control channel is transmitted (and thus less than slot duration transmission), the start OFDM symbol may be defined as offset indicated by DCI+prefixed offset. The prefixed offset may be necessary to accommodate control decoding and preparation processing for PUSCH transmission. Similar approach may also be applied to PUCCH transmission as well.

(2) If PUSCH starts in the start of slot, the default value for start of PUSCH transmission may be the next slot after control channel is transmitted.

In other words, default offset value may be configured for determining start OFDM symbol for PUSCH. The default offset value may be either predefined or higher layer configured.

When cross-carrier scheduling or cross-BWP scheduling is used, the default offset may be applied by determining either the last OFDM symbol which overlaps with the OFDM symbol used for control region or next slot after control region. If two slots are overlapped with the control region, the latter slot may be the next slot instead of pushing it to another slot. Alternatively, the slot which comes after the slot which partially or fully overlaps with control region may be the next slot.

3. Transport Block Size (TBS) Determination

With variable effective number of REs due to various RSs and/or rate matching patterns, TBS may be obtained based on a function. For example, a simple function for obtaining TBS may be defined by Equation 1.

$$TBS = \mathrm{floor}((M\_re * \text{Spectral efficiency} * \text{a number of allocated RBs})/8) \quad \text{[Equation 1]}$$

When the function is used, there may be couple of considerations to handle special packet size and variable number of effective REs due to various rate matching patterns. The followings may be considered.

(1) Special Packet Size Handling

- A set of modulation and coding scheme (MCS) and RB pairs may be reserved for special packet sizes. To support voice over Internet protocol (VoIP) or emergency service, etc., in a set of specific conditions such as a combination of MCS and number of scheduled RBs in a slot based scheduling (excluding multi-slot scheduling and mini-slot scheduling), a UE may use a TBS table where special packet sizes are defined per combination.
- A set of MCS values may be reserved for special packet sizes or may refer to a TBS table. To allow flexible RB scheduling, instead of selecting pairs between MCS/RBs, only a few values of MCS may be reserved for special packet sizes.
- Direct indication indicating whether to refer a table with special packet sizes or use the function to obtain TBS may be used. Whenever a UE is indicated with special packet sizes or need to refer a TBS table instead of function, it may be explicitly indicated by DCI. Unless otherwise indicated, a UE may use the function.
- A set of entries in MCS values may be reserved for special packet sizes. These entries may be shared between retransmission and indication of special packet sizes. For example, in case of initial transmission, the set of reserved entries may be used for special packet sizes. For the retransmission of special packets, TBS may be known by initial transmission. Or, for the retransmission of special packets the same TBS may be used based on scheduling and TBS function. For retransmission cases, the special entries may be used for changing modulation.

(2) DCI Indication for Obtaining TBS

Approach 1: MCS which represents spectral efficiency may be used for scheduling, and MCS may consists of both modulation and spectral efficiency Approach 2: Modulation and spectral efficiency may be indicated separately. A set of spectral efficiency may be different per modulation. Though it may be indicated jointly, the point is that modulation order may be different per same spectral efficiency value or per corresponding the same signal-to-interference and noise ratio (SINR) range. This may also be efficient if binary phase shift keying (BPSK)) is used, particularly for UL. Furthermore, this may also be applied to potential future adaptation of higher modulation order, such as 1024 quadrature amplitude modulation (QAM). The spectral efficiency between QAM and BPSK may be similar in the range of similar SINR, though BPSK may be selected for better peak-to-average power ratio (PAPR) or power efficiency.

Approach 3: A set of mother MCS table which consists of modulation and spectral efficiency may be pre-determined specified in the specification. A UE may be configured with start and end indices in the mother MCS table. The start and end indices in the mother MCS table may be dynamically indicated by DCI. Or, only a subset of entries may be selected from the mother MCS table, and one of the selected/configured subset of entries may be dynamically indicated by DCI.

When a UE is configured with overhead value, as the overhead value may have different impact depending on data duration, the followings may be considered.

The overhead may be scaled based on the duration of data. For example, overhead may be computed as ceil (overhead*X/12), where X is the duration of data.

The multiple values of overhead may be configured, and different value may be selected depending on the range of data duration. For example, overhead 1 and overhead 2 may be configured. Overhead 1 may be applied between 1 to 6 OFDM symbols, and Overhead 2 may be applied between 7 to 14 OFDM symbols.

4. DCI Sizes/Formats

For convenience, the following DCI formats may be defined in NR. The following DCI formats are only exemplary. Some DCI formats may be shared.

DCI format 0: DCI format used for scheduling remaining minimum system information (RMSI), i.e. system information block type 1 (SIB1)

DCI format 1: DCI format used for scheduling random access response (RAR)

DCI format 2: DCI format used for scheduling Msg4, i.e. contention resolution message in random access procedure DCI format 3: DCI format used for scheduling PDSCH containing RRC connection & configuration message DCI format 4: DCI format used for scheduling UE-specific PDSCH with transmission scheme and various features which is scheduled in USS DCI format 5: DCI format used for scheduling UE-specific PUSCH with transmission scheme and various features which is scheduled in USS DCI format 6: DCI format used for scheduling UE-specific PDSCH which is scheduled in CSS and/or fallback DCI DCI format 7: DCI format used for scheduling UE-specific PUSCH which is scheduled in CSS and/or fallback DCI DCI format 8: DCI format used for group common DCI such as transmit power control (TPC) commands DCI format 9: DCI format used for puncturing indication DCI format 10: DCI format used for slot formation indication In NR with many features involving dynamic indication via DCI, it may be necessary to allow configurability of a certain set of fields depending on the used features. In handling of various RRC reconfigurations with various features, it may be important to maintain constant DCI format which is used for fallback DCI, such as DCI format 6 and format 7 mentioned above. In this sense, Table 9 shows assumptions of different features for broadcast data by CSS, UE-specific data scheduling by USS, UE-specific scheduling by fallback DCI.

TABLE 9

|  | Broadcast channel (RMSI, RAR, Paging) | UE-specific data by USS | Fallback DCI |
|---|---|---|---|
| Code block group (CBG)-based retransmission | Not supported | UE-specifically enabled with the number of CBGs configured | Not supported |
| CBG flushing indication (CBGFI) | Not supported | Configurable to be present | Not supported |
| Dynamic vs. semi-static time-domain resource (starting/duration) information | Single slot is assumed with only a few choices of starting/duration combinations | Single slot, cross-slot, or multi-slots can be enabled to dynamically indicate by DCI. | Semi-statically fixed timing is assumed. |
| Dynamic rate matching indicator (e.g., control-data resource sharing) | Time division multiplexing (TDM) between control and data is assumed (thus not supported) | Can be enabled by higher layer signaling (e.g. configuration of set of rate matching patterns indictable by DCI) | TDM between control and data is assumed (thus not supported) |
| Subband precoding matrix indicator (PMI) | Not supported | Fixed size for UL grant if enabled | Not supported |
| Quasi-collocated (QCL) information related to data reception (control- | Assume that control and data use the same beam | Can be enabled by higher layer to dynamically indicate QCL information for | Assume that control and data use the same beam for DL. Assume |

TABLE 9-continued

| | Broadcast channel (RMSI, RAR, Paging) | UE-specific data by USS | Fallback DCI |
|---|---|---|---|
| data different beam support) | | data reception/transmission | corresponding beam to the beam used for control transmission is used for PUSCH |
| Bandwidth and BWP assumed for frequency resource allocation | Bandwidth of default BWP and default BWP | UE-specifically activated DL/UL BWP is used respectively for PDSCH and PUSCH | Depends on fallback mechanism of active BWP switching. |
| Resource block group (RBG) information | Predefined | RBG size can be configured per each BWP to align between narrowband and wideband UEs, RBG sizes can be also dynamically changed via DCI | Predefined, or configured before or during RRC connection procedure |

According to assumptions described in Table 9, the followings may be considered in detail.

(1) CBG-based retransmission: CBG-based retransmission may not be used for DCI scheduling broadcast data or fallback DCI. If CBG-based retransmission is used, the number of CBG may be configured by cell-specific signaling, such as RMSI.

(2) Indication of start and duration of data (i.e. dynamic scheduling timing and duration):

For broadcast channel where beam sweeping is expected, the followings may be indicated for start and duration of data, if FDM between SS block and data is supported.

00: start at OFDM symbol after CORESET, end at end of DwPTS,
01: same as 1st SS block in the slot,
10: same as 2nd SS block in the slot,
11: start at DM-RS symbol position of the next slot, end at end of DwPTS of the next slot When multi-beam is not used, 00 may be used as a default value.

For unicast scheduling via USS, DCI field may support only one of single/same-slot, single/cross-slot, multi-slot/same-slot, multi-slot/cross-slot at a time by higher layer configuration. Or dynamic switching among those may be supported as well. Regardless of which option is used, it may be necessary that a UE is configured with the maximum number of slots which can be referred from DCI. For example, a UE may be configured with maximum number of slots schedulable for multi-slot aggregation or maximum number of slot used for cross-slot scheduling gap.

For fallback DCI, for a simplicity, single slot and same slot scheduling may be used for PDSCH, and single slot and cross-slot with fixed gap may be used for PUSCH.

(3) BWP Assumption for Each Scheduling DCI

It is natural to assume that default BWP is used for broadcast scheduling. The default BWP may be reconfigured if it is different from BWP covering bandwidth for RMSI scheduling. Frequency and bandwidth of default UL BWP may be indicated by RMSI. For example, frequency region around physical random access channel (PRACH) configuration within UE minimum transmitting bandwidth may be defined as the default UL BWP. Default UL BWP may be used for Msg3 scheduling and other UL scheduling, until a UE is reconfigured with UE-specific active UL BWP. Also, it is natural to assume that UE-specifically activated BWP is used for unicast scheduling.

In terms of BWP for fallback DCI, it may depend on fallback mechanism of active BWP switching and (re) configuration of BWPs. If the network ensures fallback by transmitting duplicate DCI and data in both BWPs (old and new active BWP), fallback DCI may be located in UE-specifically active BWP, at least for DL. However for UL, it may become challenging. Thus, it may be necessary to define fallback BWP at least for UL, which may be used for fallback DCI scheduling. Fallback BWP may be same as default BWP.

With potential DCI fields for various features, DCI sizes for each DCI format may different from each other. Table 10 shows sizes of DCI format 0 to DCI format 3.

TABLE 10

| Field | DCI Format 0 | DCI Format 1 | DCI Format 2 | DCI Format 3 |
|---|---|---|---|---|
| MCS | M | M | M | M |
| Frequency Resource Allocation | Determined based on default BWP | Determined based on default BWP | Determined based on default BWP | Determined based on default BWP |
| Time Resource Allocation | T1 > 0 at least in multi-beam scenario | 0 if fixed or semi-statically fixed value is used and assume single slot scheduling | 0 if fixed or semi-statically fixed value is used and assume single slot scheduling | 0 if fixed or semi-statically fixed value is used and assume single slot scheduling |

TABLE 10-continued

| Field | DCI Format 0 | DCI Format 1 | DCI Format 2 | DCI Format 3 |
|---|---|---|---|---|
| NDI | 1 | 1 | 1 | 1 |
| Hybrid automatic repeat request (HARQ) process ID | 0 if default HARQ process ID is fixed | 0 if default HARQ process ID is fixed | 0 if default HARQ process ID is fixed | K1 |
| Redundancy Version | N | N | N | N |
| TPC | N/A | N/A | P bits | P bits |
| HARQ-ACK resource | N/A | N/A | S | S |
| Beam direction for PD/USCH (QCL indication) | 0 assuming same beam direction between control and data | 0 assuming same beam direction between control and data | 0 assuming same beam direction between control and data | 0 assuming same beam direction between control and data |
| MIMO related parameters (e.g., antenna port, # layers, scrambling) | 0 assuming fixed or semi-statically configured value is used | 0 assuming fixed or semi-statically configured value is used | 0 assuming fixed or semi-statically configured value is used | 0 assuming fixed or semi-statically configured value is used |
| Flag for TB based or CBG based HARQ-ACK (if configured) | N/A | N/A | N/A | N/A |
| Flag for Flushing | N/A | N/A | N/A | N/A |
| CBG bitmap for retransmission | N/A | N/A | N/A | N/A |
| # of subbands & subband PMIs for UL grant | N/A | N/A | N/A | N/A |

Table 11 shows sizes of DCI format 4 to DCI format 7.

TABLE 11

| Field | DCI Format 4 (DL DCI USS) | DCI Format 5 (UL DCI USS) | DCI Format 6 (DL DCI CSS) | DCI Format 7 (UL DCI CSS) |
|---|---|---|---|---|
| MCS | M | M | M | M |
| Frequency Resource Allocation | Determined based on active DL BWP | Determined based on active UL BWP | Determined based on active DL BWP | Determined based on active DL BWP |
| Time Resource Allocation | T2 | T3 | 0 if fixed or semi-statically fixed value is used and assume single slot scheduling | 0 if fixed or semi-statically fixed value is used and assume single slot scheduling |
| NDI | 1 | 1 | 1 | 1 |
| HARQ process ID | K2 | K3 | K1 | K1 |
| Redundancy Version | N | N | N | N |
| TPC | P | P | P | P |
| HARQ-ACK resource | S | N/A | S | N/A |
| Beam direction for PD/USCH (QCL indication) | B1 | B2 | 0 assuming same beam direction between control and data | 0 assuming same beam direction between control and data |
| MIMO related parameters (e.g., antenna port, # layers, scrambling) | Q1 | Q2 | 0 | 0 |
| Flag for TB based or CBG based HARQ-ACK (if configured) | 1 | 1 | 0 | 0 |

TABLE 11-continued

| Field | DCI Format 4 (DL DCI USS) | DCI Format 5 (UL DCI USS) | DCI Format 6 (DL DCI CSS) | DCI Format 7 (UL DCI CSS) |
|---|---|---|---|---|
| Flag for Flushing | 1 | 1 | 1 | 1 |
| CBG bitmap for retransmission | Y | Y | Y | Y |
| # of subbands & subband PMIs for UL grant | N/A | Z | 0 | 0 |

Referring to Tables 10 and 11, the required DCI size for DCI formats may vary depending on the applicability of various features, such as dynamic indication of start/end of data, subband PMI, beam related information, MIMO information, etc. Meanwhile, actual bit size for DCI formats may be different by jointly combining some fields or creating more DCI formats.

Based on the above observations, the followings may be considered.

(1) At least one DCI size X, which may be used to schedule broadcast channels such as RMSI, paging, on-demand system information (OSI), etc., may be defined.
(2) Fallback DCI may use DCI size X used to schedule broadcast channels.
(3) A UE may be semi-statically configured with a set of DCI fields (or features to be indicated dynamically), which defines necessary DCI format(s).
(4) The number of DCI sizes that a UE needs to monitor at a time should be minimized.

DCI sizes between DCIs of TB based scheduling and CBG based scheduling may be same to minimize the overhead. DCI format can be different between two.

The DCI size between DL scheduling DCI and UL grant DCI should be kept as same, as long as the padding is not significant. If padding overhead is significant, separating search space between two DCIs may be considered.

Handling various DCI formats with different features is described. With various features which may be configured explicitly or implicitly by higher layer, such as CBG based retransmission, dynamic indication of start/duration of data, flushing indication, cross-numerology or cross-BWP scheduling, cross-carrier scheduling, etc., various DCI sizes may be needed for a UE to support. In order to minimize the UE blind decoding, the following approaches may be considered.

(1) Approach 1: Single DCI size may be configured by higher layer (i.e. RRC layer) and size of fallback DCI may be prefixed. That is, the size of fallback DCI size does not change by RRC configuration. The default configurations for various optional features may be used for fallback DCI, and the size of the fallback DCI is not changed by RRC configuration. The drawback of this approach is that if the network wants to dynamically switch between two features, the overhead may be increased as the DCI needs to include fields related to both features (or both set of features).
(2) Approach 2: Multiple DCI sizes or formats may be configured depending on the enabled features, and a UE may be configured with K DCI sizes. Depending on the combinations of enabled features, a UE may be configured with possible set of DCI format(s) or DCI sizes or DCI combinations. For example, a first DCI format may include CBG based retransmission and dynamic indication of start/duration. A second DCI format may include CBG based retransmission, dynamic indication of start/duration and cross-BWP or cross-carrier scheduling. A third DCI format may not include all features which can be configured by higher layer. A UE may be configured with a set of DCI formats for each DL and UL, respectively. Then, a UE may be also configured with a set of DCI sizes that the UE can utilize per each CORESET monitoring. For example, a UE may be configured with first DCI size, second DCI size, and third DCI size. Then, if the UE is configured with three CORESETs, first CORESET may be configured with first DCI size & second DCI size, second CORESET may be configure with third DCI size, and the third CORESET may be configured with only second DCI size. For each DCI size, a UE may also be configured with which format(s) are mapped with appropriate padding.

If this approach is used, necessary indication of DCI format may be included in DCI format respectively. The necessary indication of DCI format may include DCI format index. Furthermore, if separate index is not used between DL/UL, the necessary indication of DCI format may include separation between DL and UL scheduling DCI.

If this approach is used, to support fallback DCI, it may be necessary to define fallback DCI size as well. The size of fallback DCI may be predefined or may be determined configurations by RMSI. Some quantization on default fallback DCI size may also be considered, or explicit configuration of fallback DCI size may be configured by the RMSI or OSI or PBCH.

For separating or supporting more than one DCI sizes for USS, CBG-based retransmission and TB based transmission may be supported, particularly when CBG-based retransmission size is large. Alternatively, UL subband-PMI may be supported.

Alternatively, instead of configuring of DCI sizes explicitly, a certain DCI format may be configured as reference. In other words, DCI formats may be grouped, and the size of DCI formats in the group may be determined by the reference DCI format in the group. For example, DCI format 1 & 2 may be grouped, and size of DCI format 2 may be determined by DCI format 1 which is a reference DCI format in the group. For another example, DCI format 1, 2 and 3 may be grouped, and size of DCI formats 2 and 2 may be determined by DCI format 3 which is a reference DCI format in the group. In other words, a set of groups of DCI formats may be defined with a reference DCI format per each group. The DCI size or reference DCI format may be implicitly defined by the largest payload DCI format among DCI formats in the group.

Figure 9:
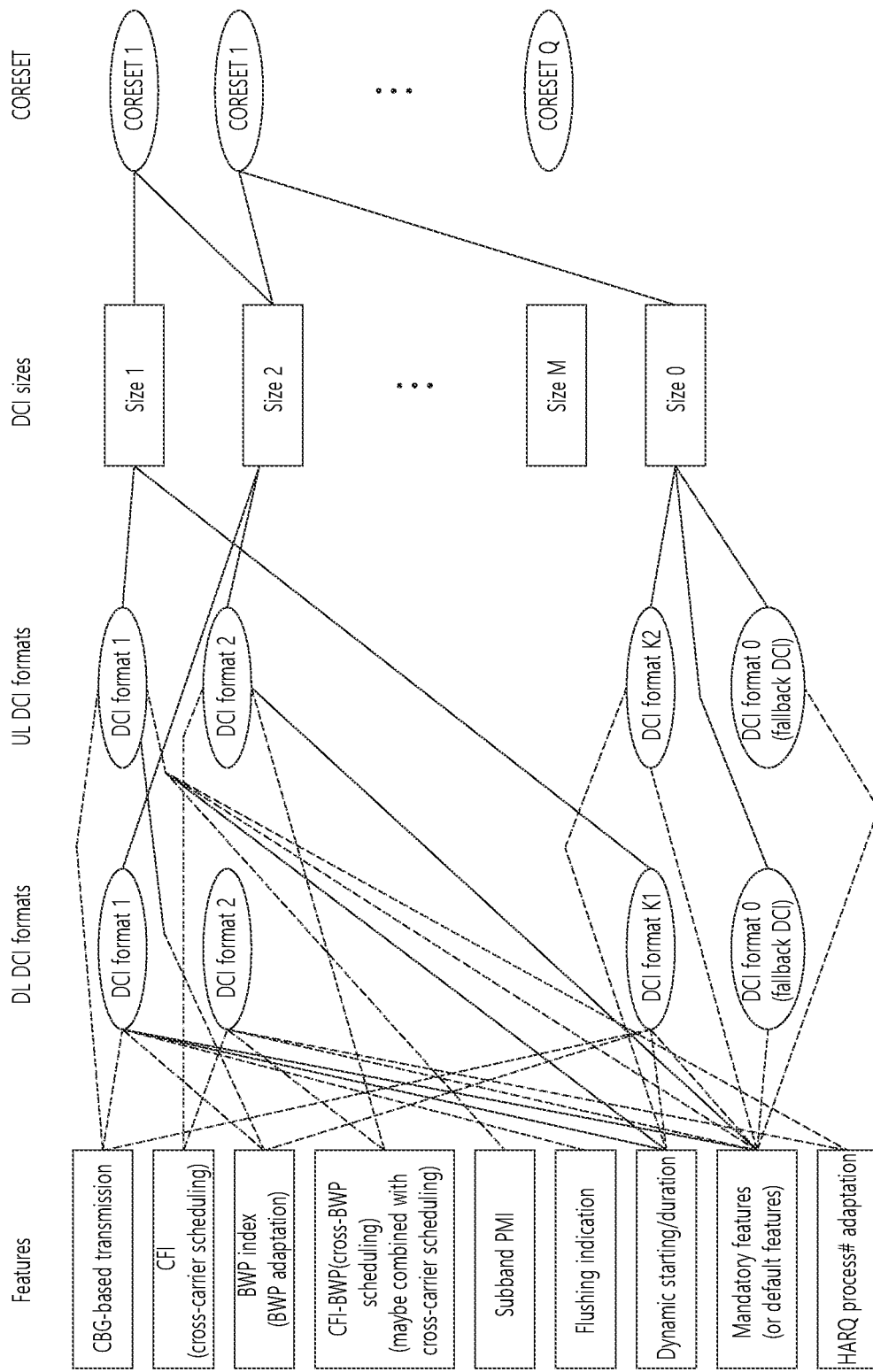
FIG. 9 shows an example of relationship between various features, DL DCI formats, UL DCI formats, size of DCI formats and CORESET according to an embodiment of the present invention.

FIG. 9 shows an example of relationship between various features, DL DCI formats, UL DCI formats, size of DCI formats and CORESET according to an embodiment of the present invention. Referring to FIG. 9, for example, DL DCI format 1 includes information on CBG-based retransmission, information on dynamic indication of start/duration, information on mandatory features (or default features), and information on number of HARQ process adaptation. DL DCI format has a size 2, and is mapped to CORESET 1. On the other hand, DL DCI format 0, which is fallback DCI, only includes information on mandatory features (or default features). DL DCI format 0 has size O, and is mapped to CORESET 2.

There may be multiple DCI formats for scheduling broadcast channels, such as RMSI, paging, RAR, etc. Each format may be expected to be accessed in different search space, and each search space may or may not share the same CORESET. If there is no explicit configuration, default behavior may be to share the same CORESET configured for RMSI for other broadcast channels. In such case, it may be desirable to align sizes for DCIs scheduling broadcast channel. Furthermore, there may be multiple group common DCIs, such as group common PDCCH, group common TPC commands, group common HARQ-ACK. Each group common DCI may be treated as a single DCI format, and size of group common DCI may be aligned with different DCI formats, following the description mentioned above.

In summary, the present invention proposes the followings for DCI sizes/formats.

A set of DCI formats may be defined and/or configured based on enabled features by the UE or cell-specific higher layer signaling.

A set of groups for DCI formats may be defined, and DCI formats in each group may have a single size. The single size for DCI formats may be defined by configuring a set of DCI sizes or a set of DCI formats in each group. The single size for DCI format for each group may be either explicitly configured or determined based on a reference DCI format or determined based on the largest DCI size among DCI formats in the group.

For each group, a UE may be also configured with one or more CORESET(s), and the UE may be supposed to monitor the given group. Within each group (i.e. DCI format group), DCI format indicator may be configured to differentiate different DCI formats. A size of DCI format indicator may be added to the size of DCI for each group. For example, if the group has two DCI formats, a size of DCI format indicator bit may be 1 bit, and if the group has three DCI formats, a size of DCI format the indicator bit is 2 bits. Alternatively, the size of the DCI format indicator may also be configured per each group or may be defined by the maximum possible number of DCI formats belonging to the group. At least for the group containing default or fallback DCI, it may be necessary to have prefixed DCI format indicator. Only DL and UL may be separated by single bit, and other DCI formats may be differentiated by RNTI.

If the DCI format indicator is used, there may be no need of separating RNTI per different broadcast channel such as RMSI, paging, and RAR. Instead, different RNTIs may be used per transmission/reception point (TRP). In other words, RNTI value may be same for DCI formats having the same size, and the DCI format indicator may differentiate the purpose or the scheduling target of the DCI. For example, it may be assumed that DCI format 0 is used for RMSI, DCI format 1 is used for paging, DCI format 2 is used for RAR, and DCI format 3 is used for Msg 4. This may increase the overhead of DCI, however. So, the necessary number of RNTIs reserved for broadcast channel may be reduced by the DCI format indicator.

For each DCI format in the group, the number of blind decodings per each aggregation level may also be configured. Even with the same CORESET, different number of blind decodings may be allocated to different DCI format. However, for the simplicity, a size of DCI formats for each group may be same regardless of separate blind decoding configurations per DCI format.

There may be a default DCI format group which contains fallback DCI. The fallback DCI may be configured by RMSI or may be prefixed. As the fallback DCI may be shared with CORESET for RMSI, the size of the fallback DCI may be defined by PBCH, if the size of scheduling RMSI is not be used for the size of the default DCI format group. In other words, the default DCI format group with fixed size, which may be configured by PBCH or RMSI or predefined, carrying at least fallback DCI(s) may be defined.

At least CORESET for group common PDCCH, UE-specific scheduling, RACH procedures, etc., may be configured per each configured BWP. Depending on UE capability and the network operation, a UE may be configured with only one BWP or multiple BWPs. Thus, DCI design should consider both cases.

There are at least the following CORESETs configured to a UE.
(1) RMSI CORESET: This may be shared with other OSI, RAR/Msg4 and UE-specific scheduling.
(2) RAR/Msg4 CORESET
(3) UE-specifically configured CORESET
(4) CORESET for CSS configured separately for each configured BWP (e.g. for group common DCI)

As different DCI sizes may potentially lead increased blind decoding of control channels, at least the following aspects needs to be clarified in order to determine DCI sizes.
Which features can be enabled in the monitored DCI in a combination of {CORESET, a search space type, RNTI}?
What is the resource allocation type for both time/frequency domain, and bandwidth for frequency domain, maximum duration/slots for time domain?

Table 12 shows an example of DCI formats/main features/frequency bandwidth and/or time domain resource allocation for each CORESET/SS type and RNTI.

TABLE 12

| | CORESET, SS type, RNTI | | | |
|---|---|---|---|---|
| | DCI formats | Main features | Frequency BW | Time domain resource allocation |
| RMSI CORESET, CSS, {SI-RNTI, RAR-RNTI, Temp-C-RNTI, C-RNTI} | Same as fallback DCI | Same as fallback DCI | Initial DL/UL BWP | Following predefined table |

TABLE 12-continued

| | DCI formats | Main features | Frequency BW | Time domain resource allocation |
|---|---|---|---|---|
| CORESET, SS type, RNTI | | | | |
| RMSI CORESET, USS, {C-RNTI} | Same as fallback DCI | Same as fallback DCI | Initial DL/UL BWP | Following predefined table |
| RAR CORESET, CSS, {RAR-RNTI, Temp-C-RNTI, C-RNTI} | Same as fallback DCI | Same as fallback DCI | Initial DL/UL BWP | Following predefined table |
| UE-specific CORESET, CSS, {C-RNTI} | Same as fallback DCI | Same as fallback DCI | Configured BW, which can be different from UE-specific BWP's BW | Following predefined table |
| UE-specific CORESET, USS, {C-RNTI} | TM-DCI-format, fallback DCI | Configured features, fallback DCI features | Configured BWP's BW | Following configured table |

Referring to Table 12, DCI format scheduling RMSI, OSI, RAR and Msg4 is same as DCI format for fallback DCI. Furthermore, a frequency domain bandwidth which can be scheduled by a DCI in CSS of RMSI CORESET is defined by initial DL and UL BWP.

To handle various DCI format(s) with various features configured to a UE, mechanisms to reduce the number of DCI sizes at a given time should be considered. Generally, the followings may be considered.

(1) Approach 1: Maximum DCI size which can cover the necessary DCI formats with potentially DCI format may be configured. AUE may interpret the DCI contents differently depending on DCI format. Two DCI sizes may be defined, one which is for fallback DCI and the other for UE-specific scheduling DCI. By this approach, DL/UL scheduling DCI sizes may be aligned by necessary padding, and the maximum DCI size may be determined based on configuration of various features.

(2) Approach 2: DCI formats with similar DCI sizes may be grouped and each CORESET may be configured with one or more of grouped DCI formats. For example, four DCI groups may be defined. A first DCI group may include compact DCIs for group common DCI/PDCCH, a second DCI group may include fallback DCI for DL/UL and DCIs for broadcast channels, a third DCI group may include DCIs for UE-specific PDSCH scheduling (transmission mode (TM) version), and a fourth DCI group may include DCIs for UE-specific PUSCH scheduling (TM version). Each CORESET may be configured with different DCI groups. Instead of configuration of different set per CORESET, separate search space may also be considered.

(3) Approach 3: A CORESET may be configured with one or two DCI sizes. Each DCI size may also be configured with DCI format(s). The configured DCI format(s) may use the configured/same DCI size by necessary padding.

(4) Approach 4: Separate transmission of DCI format with DCI payload may be configured. Each DCI format may indicate the necessary DCI size.

Table 13 shows potential benefits and drawbacks of each approach mentioned above.

TABLE 13

| | Benefits | Drawbacks |
|---|---|---|
| Approach 1: Utilize maximum DCI size commonly | A UE needs to support only a few DCI sizes regardless of various configurations in terms of CORESETs and features. | In case the discrepancy between the maximum sized DCI format and the smaller DCI formats, padding overhead can be increased. |
| Approach 2: Utilize multiple DCI sizes with grouping of DCI formats | Padding overhead can be reduced. | It may impose scheduling constraints where some DCI format(s) may not be schedulable in all CORESETs or some partitioning of search space or CORESET among different DCI formats is necessary. |
| Approach 3: Network configuration between DCI size and DCI format(s) | Based on the configuration, it can achieve benefits of Approach 1 and 2. | Handling of fallback and broadcast is necessary which needs to work without configuration. For that, at least one DCI size for fallback and broadcast channels seems necessary. |
| Approach 4: Separate DCI formation indication | Padding overhead can be reduced. | It is complicated to design separate coding between DCI fields, and also, search space and DCI mapping. |

Based on the above observations, approach 3 may be preferred. That is, to minimize the number of DCI sizes that a UE needs to monitor at a time, a network may configure one or two DCI sizes per CORESET. For each size, one or more DCI format(s) may be mapped. For the DCI format(s) mapped to the same DCI size may use padding to align the DCI size. For each DCI size, additional field may be used to differentiate DCI format(s) sharing the same size, if there are multiple DCI formats. A size of fallback DCI and DCI for broadcast channels may be predefined, or may be computed without RRC signaling. For a CORESET where the UE monitors fallback DCI and/or broadcast channels, one of the configured DCI size may be same as size for fallback DCI and DCI for broadcast channels.

5. Aperiodic Channel State Information (CSI) Support in DCI

In NR, aperiodic CSI on PUCCH may be supported as well in addition to aperiodic CSI on PUSCH. The main benefits of aperiodic CSI on PUCCH is faster and shorter transmission of CSI by utilizing short PUCCH design compared to PUSCH. Aperiodic CSI on PUCCH may be supported on short PUCCH only. Aperiodic CSI on PUCCH may be a complementary and optional feature in addition to aperiodic CSI on PUSCH. Aperiodic CSI on PUCCH may be triggered by utilizing existing DCI format/fields and by minimizing specification impacts.

As mentioned above, aperiodic CSI on PUCCH may be supported only on short PUCCH. In that case, depending on UE geometry or needed coverage, it is possible that aperiodic CSI on PUCCH cannot be triggered even though aperiodic CSI on PUCCH is configured. In this case, it may seem wasteful to have a separate field in DL DCI for triggering aperiodic CSI on PUCCH. Furthermore, aperiodic CSI on PUCCH and aperiodic CSI on PUSCH may not be triggered simultaneously. It is more desirable that either one is triggered depending on the necessity. Therefore, combining aperiodic CSI trigger in one DCI may be preferable regardless whether the CSI is transmitted on PUCCH or PUSCH. Thus, aperiodic CSI trigger in UL grant may be reused for triggering aperiodic CSI on PUCCH. More specifically, a CSI request field in UE-specific UL-related DCI may trigger a CSI report on PUCCH. If PUCCH or PUSCH is used for CSI reporting, it may be indicated in the CSI report setting.

When aperiodic CSI on PUCCH is triggered in UL grant, how to determine PUCCH resources in time-domain should be further clarified. In UL grant, indicating starting of PUSCH transmission may be indicated dynamically or based on semi-static configuration. To determine time domain information for PUCCH and PUSCH scheduled by one UL grant, the following options may be considered.

(1) Option 1: Aperiodic CSI on PUCCH may be transmitted right before the scheduled PUSCH. For example, if PUSCH is scheduled between OFDM symbols 5-11, aperiodic CSI on PUCCH may be scheduled at OFDM symbol 4 (if 1 symbol PUCCH is configured)

(2) Option 2: Aperiodic CSI on PUCCH may be transmitted at the indicated start OFDM symbol for PUSCH. That is, PUSCH transmission starts after aperiodic CSI on PUCCH transmission is completed. For example, if PUSCH is scheduled between OFDM symbols 5-11, and aperiodic CSI on PUCCH is scheduled at OFDM symbol 5 (if 1 symbol PUCCH is configured), PUSCH transmission occurs between OFDM symbols 6-11.

(3) Option 3: Aperiodic CSI on PUCCH may be transmitted right after the scheduled PUSCH. That is, aperiodic CSI on PUCCH transmission starts after PUSCH transmission is completed. For example, if PUSCH is scheduled between OFDM symbols 5-11, aperiodic CSI on PUCCH may be scheduled at OFDM symbol 12 (if 1 symbol PUCCH is configured).

(4) Option 4: Aperiodic CSI on PUCCH may be transmitted at the end OFDM symbols of the scheduled PUSCH. For example, if PUSCH is scheduled between OFDM symbols 5-11, aperiodic CSI on PUCCH may be scheduled at OFDM symbol 11 (if 1 symbol PUCCH is configured), and PUSCH occurs between 5-10.

(5) Option 5: Time domain information for aperiodic CSI on PUCCH may be configured in report configuration within a slot, and the time domain information may be used for PUCCH. PUSCH transmission may not occur in the same OFDM symbol where PUCCH is transmitted. This may be realized by dynamic scheduling or PUSCH may be rate matched on the OFDM symbols where PUCCH is transmitted.

It should be further studied whether short PUCCH can be located in any OFDM symbol when slot based scheduling is used. Some of options may not be available in some situations. In that case, the benefits of aperiodic CSI on PUCCH may be very limited. Accordingly, it may be preferable to configure the time domain information of aperiodic CSI on PUCCH. In other words, option 5 mentioned above may be adopted regardless of short PUCCH design. If short PUCCH is allowed in any OFDM symbol, option 2 may be adopted to maximize the benefits of aperiodic CSI on PUCCH. In summary, UL-grant may carry aperiodic CSI trigger regardless of container (i.e. PUCCH or PUSCH). In UL-grant carrying trigger on aperiodic CSI on PUCCH, time domain information on short PUCCH may be determined by report configuration semi-statically or may be determined based on the location of scheduled PUSCH if short PUCCH can be transmitted in any OFDM symbols.

Alternatively, which option is used for aperiodic CSI on PUCCH may be configured in report configuration. Alternatively, aperiodic CSI on PUCCH may not be triggered with uplink shared channel (UL-SCH). In other words, when aperiodic CSI on PUCCH is triggered, PUSCH may not be scheduled. Furthermore, aperiodic CSI on PUCCH may be triggered with or without UL-SCH. In this case, resource allocation field may be set as zero or set as a predefined value. Or, a set of DCI fields may be set as a predefined value to indicate no resource allocation for PUSCH in frequency domain. Time domain resource allocation may be used for PUCCH time domain information, and PUSCH will not be scheduled. In other words, aperiodic CSI without UL-SCH may also be triggered by UL grant even when aperiodic CSI on PUCCH is triggered.

When option 1 is used where DL grant is used for aperiodic CSI trigger, similar approach may be considered. That is, aperiodic CSI may be triggered without downlink shared channel (DL-SCH) transmission. Similar to UL grant without UL-SCH or PUSCH, a set of predefined value may be used for a set of DCI fields. Or, a resource allocation field may be set to a predefined value.

Furthermore, when option 1 is used, it needs to be clarified that whether HARQ-ACK and CSI will always be combined or not. If HARQ-ACK and CSI will be combined and PUCCH format for HARQ-ACK is indicated differently, the benefits of aperiodic CSI on PUCCH may be limited. Thus, aperiodic CSI trigger may transmitted only in DL grant. If there is scheduled data, CSI and HARQ-ACK may be combined in PUCCH, and CSI and HARQ-ACK simultaneous transmission flag may be enabled. Depending on PUCCH format/resource configuration, aperiodic CSI may also be transmitted. In other words, this may be similar as periodic CSI. When PUCCH format does not carry all information due to limited resource, it is possible to drop some of aperiodic CSI contents.

When option 1 is used, PUCCH format carrying more than 2 bits may be used, and SR may also be carried jointly if SR is triggered.

When option 1 is used, and more than one PUCCH resources collide partially or fully, aperiodic CSI on PUCCH may be considered as the higher priority than periodic CSI, semi-persistent CSI and/or sounding reference signal (SRS) (including aperiodic SRS), but may be considered as lower priority than HARQ-ACK/SR.

When HARQ-ACK is piggybacked to PUSCH due to non-simultaneous transmission between PUCCH and PUSCH, aperiodic CSI on PUCCH also needs to be piggybacked on PUSCH. However, because aperiodic CSI on PUCCH needs fast feedback and the network was able to trigger aperiodic CSI on PUSCH, if aperiodic CSI on PUCCH collides with PUSCH, aperiodic CSI on PUCCH may be dropped, instead of piggybacking on PUSCH. Particularly, in carrier aggregation (CA), when different numerology is used or different length between PUCCH and PUSCH is used, it may be desirable not to piggyback aperiodic CSI on PUCCH via PUSCH.

In other words, aperiodic CSI on PUCCH may be transmitted only via PUCCH in indicated resource. If the aperiodic CSI on PUCCH collides with other dynamically scheduled resource (e.g. HARQ-ACK PUCCH resource or PUSCH resource), the aperiodic CSI on PUCCH may be dropped. When the aperiodic CSI on PUCCH collides with type 1 or type 2, the following approaches may be considered.

- Higher priority may be put on type 1 or type 2, and aperiodic CSI may be dropped if type 1 and 2 is configured to have higher priority over UL grant PUSCH or PUCCH.
- For aperiodic CSI on PUSCH, priority between UL grant based PUSCH and type1/2 may be followed. For aperiodic CSI on PUCCH, priority rule between PUCCH/CSI and type1/2 may be followed.
- Higher priority may always put on dynamically scheduled including aperiodic CSI.
- If piggyback on type1 or 2 is allowed, aperiodic CSI may be piggybacked. Otherwise, which one to drop may be determined based on priority rule.

6. Fallback DCI (1) Frequency Resource Allocation

When each BWP has CORESET configuration for CSS, the size of resource allocation which can be indicated by CSS needs to be clarified. The following approaches may be considered.

- Explicit indication of bandwidth & frequency location: Bandwidth and frequency location of frequency resource allocation may be indicated by the network per each BWP.
- The same frequency region of configured CORESET for CSS may be used for resource allocation as well. If CORESET configuration is not contiguous, either the same dis-contiguous resource allocation may be used (which may complicate resource allocation) or the first and end of allocated CORESET may be used to determine bandwidth and frequency location.
- The same frequency/bandwidth resource may be used for initial DL/UL BWP (at least resource allocation field size may be same as initial DL/UL BWP) or default DL/UL BWP.
- Regardless of CORESET configuration, the same bandwidth may be used, and the start frequency may be same as the first PRB of CORESET configuration. The bandwidth may be determined by the configured resource allocation field size or the resource allocation field size used in initial DL/UL BWP may be used.
- Resource allocation for CSS may be based on the indicated frequency/bandwidth. The indicated frequency/bandwidth may be different from the configured DL or UL BWP.
- If initial DL/UL BWP is also configured as one of BWP, or DL/UL BWP may include initial DL/UL BWP, and the same CORESET to RMSI CORESET is used in that BWP, the same DCI field/size to initial DL/UL BWP may be used in such BWP.

(2) Time Domain Resource Allocation

For fallback DCI used in different BWP from initial DL/UL BWP, time domain resource allocation field may also be configured. When information on time domain resource allocation is used, and a different set of values are configured per each BWP, the timing value of scheduled BWP may always be used to apply the actual slot/resource for transmission/reception of data.

7. Search Space Set and DCI Size Determination

Due to BWP adaptation and various DCI formats with different monitoring periodicity, it needs to be clarified how the UE determines DCI size(s) monitored in one search space or across multiple search spaces. It also needs to be clarified how the UE performs necessary padding to align the determined DCI size(s). In terms of DCI monitoring in PCell and/or primary secondary cell (PSCell), the following cases may be considered.

(1) Case 1: Initial DL/UL BWP Before RRC Connection

Unless explicit search space set configuration is given, CORESET for RMSI may be used for scheduling RAR, Msg4, UE-specific RRC messages, etc. In this case, search space set may be defined as the same set of aggregation level & number candidates configured for RMSI or SI. Alternatively, for determining search space set, default monitoring periodicity/offset may be defined as 1 slot. In other words, in every slot, a UE may monitor the corresponding CORESET for Msg4, UE-specific RRC messages. In other words, when USS is constructed, the same configuration of set of {aggregation level, number of candidates} may be inherited, unless there is no explicit configuration. In terms of monitoring periodicity/search space, single slot with zero offset may be used until reconfigured. Alternatively, the first slot in every 1 ms may be used as the default monitoring periodicity/offset.

Alternatively, search space set for RACH procedure, paging, OSI update, etc., may be configured separately. Regarding DCI size, the following options may be considered.

- Option 1: There may be only one DCI size per each configured search space set. All DCI formats associated with RNTIs configured with the same search space set may use the same DCI size via padding. In this option, DCI format 1_0 (i.e. fallback DCI) size may not change via padding at least scheduled in CSS. If other DCI format has larger size than DCI format 1_0 such that 1_0 needs to be padded for alignment, it may be considered as an error case. In this case, other DCI formats may be truncated to align the size to DCI format 1_0 in CSS. In USS, the padding may be attached for the maximum size of all DCI formats sharing the same search space set. Alternatively, the DCI size may be different depending on the search space set. If USS is configured in multiple USS, a UE may monitor different DCI payload sizes in different USS. This may be configured as 'monitor both DL scheduling DCI and UL grant' or 'monitor either'. Alternatively, a DCI size monitored in each search space set may be configured.
- Option 2: A UE may follow the size configured for each RNTI. When DCI format related to slot formation indicator (SFI) is to be monitored in a carrier, the payload size may be configured. The payload size may always be used for DCI format related to SFI without additional zero-padding. A payload size of DCI format related to pre-emption indicator (PI) may be configured without additional zero-padding. Similarly, DCI format related to TPC may also have the payload size.
- Option 3: In one search space set in a slot, particularly, for CSS, the DCI size may be determined as follows. A payload size for DCI format related to SFI may be configured. For DCI format related to PI, the same size as fallback DCI format, i.e. DCI format DCI 1_0, may be used. The size of fallback DCI format may be determined based on one of initial DL BWP, current active BWP, or virtual DL BWP (same as CORESET bandwidth). For DCI format related to TPC, the same size as fallback DCI format, i.e. DCI format DCI 1_0, may be used.

(2) Case 2: Initial DL/UL BWP after RRC Connection

In this case, the same mechanism used for case 1 mentioned above may also be used. If the same configuration of initial DL/UL BWP is configured, the behavior needs to be clarified. If a UE is not configured with default BWP such that the UE needs to go back to initial BWP upon the timer expires, CORESET used in initial BWP may also be reused.

When RMSI CORESET is reused, DCI size(s) used in RMSI CORESET may be inherited for CSS. The parameters such as REG-CCE mapping, local RS sequence generation, etc., of RMSI CORESET properties may be maintained. But in DCI format 0_0/1_0 in USS, DCI size may be different from the case the UE monitors DCI before RRC connection, as the configurations are available. In other words, when a UE reuses RMSI CORESET, DCI format/size(s) in CSS may be same as initial access, whereas USS may inherit CORESET properties with potentially different DCI size.

If a UE is configured with SCell or PSCell with assistance on CORESET configuration, as RMSI CORESET 0 in a cell may be special, because it has different REG indexing/RB indexing/sequence mapping compared to other CORESET. Therefore, it also needs to be clarified whether the configured CORESET is CORESET 0 of the cell or not. As a default, the configured CORESET is not RMSI CORESET of a cell. If it is configured as a RMSI CORESET, a UE may use special mapping in REG mapping/RB mapping/sequence generation/etc.

(3) Case 3: Default DL/UL BWP (4) Case 4: UE-specific CSS during BWP switching

Regarding DCI size, the following options may be considered.

Option 1: There may be only one DCI size per each configured search space set. All DCI formats associated with RNTIs configured with the same search space set may use the same DCI size via padding. In this option, DCI format 1_0 (i.e. fallback DCI) size may not change via padding at least scheduled in CSS. If other DCI format has larger size than DCI format 1_0 such that 1_0 needs to be padded for alignment, it may be considered as an error case. In this case, other DCI formats may be truncated to align the size to DCI format 1_0 in CSS. In USS, the padding may be attached for the maximum size of all DCI formats sharing the same search space set.

Or, DCI format 1_0 (i.e. fallback DCI) size may be determined based on the assumption that multiple UEs sharing the same CSS may be configured with different BWPs. In this sense, to fix the same size among UEs, DCI field size may be determined based on non-BWP-specific configurations. If there is BWP-specific configuration, it may be applied to DCI format(s) in USS or CSS which are not shared with RNTI for broadcast channel, such as SI-RNTI, P-RNTI, SFI-RNTI, etc. For example, DCI field size may be determined based on initial DL BWP bandwidth and time domain resource allocation information. For another example, the DCI field size may be determined based on the bandwidth of CORESET where the corresponding search space set is configured. In terms of frequency resource allocation, the same frequency region to CORESET frequency may be used, or RBs between start and end of PRBs of CORESET may be used for scheduling. Resource allocation frequency region and bandwidth may also be configured separately.

In terms of a size of resource allocation field in UL grant, same RA field size may be used for UL. As UL grant is generally UE-specific only, as long as resource allocation field size is maintained as the same, different UL BWP may also be scheduled between different UEs. In terms of determining frequency location of UL BWP scheduled by fallback UL grant, if the required resource allocation field size is larger than required resource allocation field size of DCI format 1_0, truncation (of most significant bits (MSBs)) may be used. At least in unpaired spectrum, the same frequency region to DL BWP where fallback DCI format 1_0 is scheduled may also be used for fallback DCI format 0_0.

Or, in terms of a size of resource allocation field in UL grant, same resource allocation field size from initial UL BWP may be used.

Or, in terms of a size of resource allocation field in UL grant, maximum resource allocation field size may be used for configured UL BWPs. No UL BWP switching ambiguity is addressed by UE. Even in this case, zero-padding on DCI format 1_0 is not occurred. If the size of DCI format 0_0 is larger than DCI format 1_0 due to resource allocation field size, resource allocation field may be truncated until DCI format 0_0 has the same size as DCI format 1_0.

Or, in terms of a size of resource allocation field in UL grant, resource allocation field size of fallback DCI 0_0 format may be determined as resource allocation field size of DCI format 1_0+{size of DCI format 1_0—size of DCI format 0_0 (except for resource allocation field)}. In this case, truncation or zero-pad of resource allocation field size may be done to meet the size.

Alternatively, DCI field size may be determined based on BWP-specific configurations.

Alternatively, the DCI size may be different depending on the search space set. If USS is configured in multiple USS, a UE may monitor different DCI payload sizes in different USS. This may be configured as 'monitor both DL scheduling DCI and UL grant' or 'monitor either'. Alternatively, a DCI size monitored in each search space set may be configured.

Option 2: A UE may follow the size configured for each RNTI. When DCI format related to slot formation indicator (SFI) is to be monitored in a carrier, the payload size may be configured. The payload size may always be used for DCI format related to SFI without additional zero-padding. A payload size of DCI format related to pre-emption indicator (PI) may be configured without additional zero-padding. Similarly, DCI format related to TPC may also have the payload size.

Option 3: In one search space set in a slot, particularly, for CSS, the DCI size may be determined as follows. A payload size for DCI format related to SFI may be configured. For DCI format related to PI, the same size as fallback DCI format, i.e. DCI format DCI 1_0, may be used. The size of fallback DCI format may be determined based on one of initial DL BWP, current active BWP, or virtual DL BWP (same as CORESET bandwidth). For DCI format related to TPC, the same size as fallback DCI format, i.e. DCI format DCI 1_0, may be used.

In summary, the followings may be proposed.

(1) No padding is used for DCI format 1_0 if it is scheduled in CSS. For example, in initial DL BWP, the size of DCI format 1_0 may be determined based on initial DL BWP. To maintain the same DCI size, it may be necessary not to change size of DCI format 1_0 by padding. If the size of DCI format 0_0 is larger than DCI format 1_0 due to e.g. larger bandwidth, necessary truncation may be done such that DCI format 1_0 and 0_0 can be aligned. This may also be essential for non-initial DL BWP, as the size of DCI format 1_0 can be different among UEs with different UL BWPs. If DCI format 1_0 size is changed based on a UE's UL BWP, it will impact on other UEs. In this sense, it seems necessary to fix size of DCI format 1_0 when it's scheduled in CSS.

(2) Padding may be done on either DCI format 1_0 or DCI format 0_0 to align the size if they are scheduled in USS: As there is no impact on other UEs in USS, the DCI size may be determined by the maximum between DCI format 1_0 and DCI format 0_0 in USS.

(3) One DCI size per each search space set (except for SFI): There may be multiple RNTIs configured to a search space set (e.g. SI-RNTI, INT-RNTI, TPC-PUSCH-RNTI), and each related DCI format may have different payload size. As the network can configure separate search space set for RNTI(s) with different blind decoding candidates, one DCI size may be assigned per each CSS for all configured DCI formats. If a CSS includes DCI format 1_0, padding on other DCI formats may be used to align size to DCI format 1_0. If a CSS does not include DCI format 1_0, the maximum DCI payload size may be used for padding. Also for USS, separate search space set with different DCI size may be configured. A UE may assume that the same DCI size is used for DCI formats sharing the same search space set.

(4) Frequency resource allocation field size of DCI format 1_0 in CSS may be determined by the bandwidth of the CORESET. As CSS should be able to be shared among UEs configured with different BWPs (e.g. narrowband UEs and wideband UEs), and between BWPs of a single UE (e.g. narrowband and wideband BWPs), it is not desirable that size of DCI format 1_0 varies according to the bandwidth of active DL BWP. Accordingly, DCI format 1_0 frequency resource allocation in CSS may be determined based on the CORESET configuration which contains DCI format 1_0 in CSS. If there are multiple CORESETs for that, the lowest CORESET index may be used. There may be only one CSS containing DCI format 1_0 per each BWP.

Figure 10B:
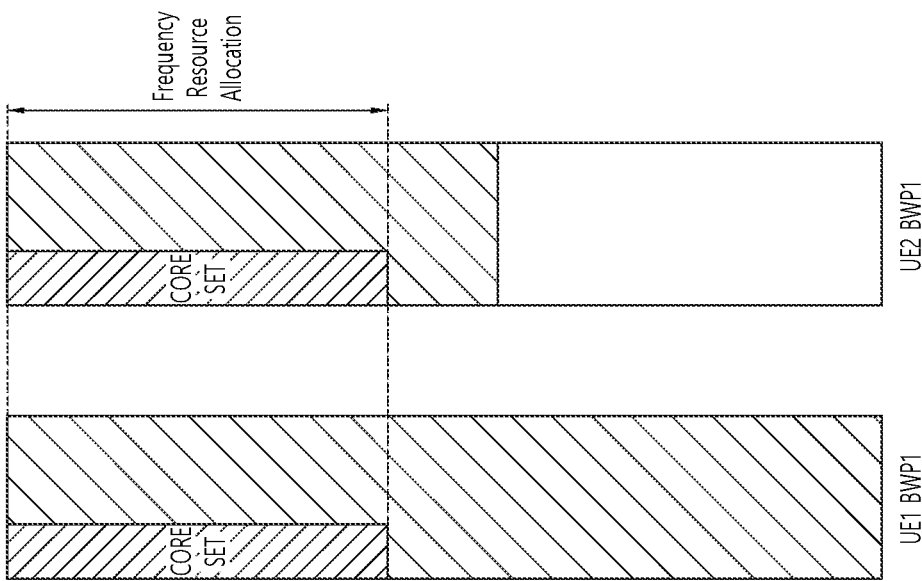
FIGS. 10A and 10B show an example of frequency resource region to allow sharing of CSS among different BWPs according to an embodiment of the present invention.
Figure 10A:
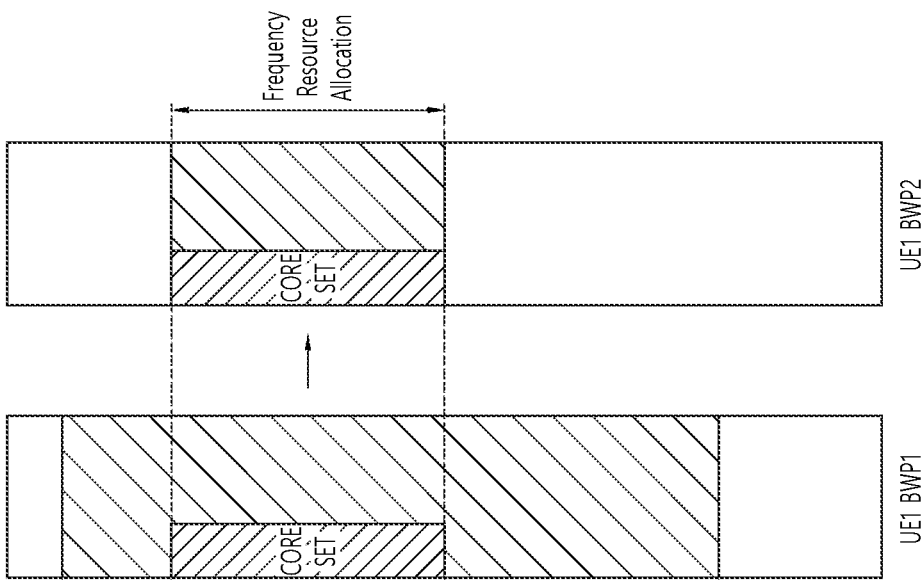

FIGS. 10A and 10B show an example of frequency resource region to allow sharing of CSS among different BWPs according to an embodiment of the present invention. FIG. 10A shows a case of CSS sharing within the same UE, i.e. BWP1 and BWP2 of the same UE. FIG. 10B shows a case of CSS sharing across multiple UEs, i.e. BWP1 of UE1 and BWP1 of UE2.

(5) DCI format 0_0 schedules data in the currently active UL BWP: If currently active UL BWP requires large resource allocation field size, necessary truncation to be aligned with DCI format 1_0 in CSS may be assumed.

(6) In a BWP, to have the same size between DCI format 1_0 with SI-RNTI/RA-RNTI and C-RNTI, it needs to align frequency domain resource allocation field size. One simple approach is to use the bandwidth of currently active DL BWP. However, this may restrict that broadcast scheduling DCI can be shared among UEs configured with BWPs with the same BW. Another approach is to configure separate frequency/bandwidth and broadcast scheduling DCI may be scheduled in BWP, which may be different from the currently active DL BWP (can be smaller or equal to the active DL BWP). In this case, to align DCI sizes among different UEs with different BWP configurations, maximum frequency domain resource allocation field size for DCI format 1_0 may be configured by higher layer. That is, the bandwidth and frequency region where DCI format 1_0 can schedule with SI-RNTI, RA-RNTI, P-RNTI may be configured in CORESET configuration in each DL BWP except for RMSI CORESET. If it is not configured, the currently active DL BWP may be used for bandwidth/frequency region. Furthermore, frequency domain resource allocation field size used in DCI format 1_0 may be configured. If it's not configured, the field size is determined by the bandwidth of currently active DL BWP.

(7) In addition, size of DCI format 1_0 may also be aligned with DCI format 0_0. In terms of frequency region/bandwidth for DCI format 0_0, it needs to be clarified that which UL BWP the DCI schedules. For example, current active UL BWP may be used. This may lead that size of DCI format 0_0 changes depending on change of UL BWP. To avoid this, resource allocation field size for DCI format 0_0 may be maximum resource allocation field size among the configured UL BWPs. To align DCI format 0_0 with DCI format 1_0 shared among multiple UEs with different BWPs, min {configured resource allocation field size for DCI format 1_0+k, Maximum resource allocation field size among UL BWPs} may be used. As DCI format 1_0 may have more fields than DCI format 0_0, to align the size, resource allocation field size for DCI format 0_0 may be larger than that of DCI format 1_1 by the gap k. For example, k may be 6 or 7 depending on supplemental UL (SUL) configuration. That is, for DCI format 0_0, resource allocation field size may be determined in consideration of configured UL BWPs and DCI format 1_0. Resource allocation field size of DCI format 0_0 may be defined as min {Configured resource allocation field size for DCI format 1_0+k, maximum resource allocation field size among UL BWPs}, where k bits is the gap between DCI format 1_0 and DCI format 0_0 assuming the same resource allocation field size.

(8) To avoid any RRC configuration, fixed resource allocation field size may be used for DCI format 1_0, and the frequency region in an active DL BWP may be defined as the set of PRBs from the lowest PRB in the active DL BWP.

8. Frequency-domain resource allocation (1) RBG Size/Number Determination

In determining RBG size, at least two aspects need to be considered. First is how to adjust RBG size depending on bandwidth when active BWP can be changed dynamically. At least via media access control (MAC) control element (CE) or DCI, BWP can be switched and handling of DCI format/sizes needs to be addressed. Second aspect is how to handle different use cases such as any optimization for DCI scheduling ultra-reliable and low latency communications (URLLC) applications, or any optimization for non-slot scheduling in which control overhead can generally become relatively larger due to shorter scheduling unit duration.

For the first aspect, semi-statically configured RBG size(s) per BWP for deriving number of RBGs may be preferred, because it can offer the flexible configuration by the network. To support dynamic BWP adaptation without changing DCI sizes to minimize reconfiguration ambiguity, the network can configure RBG sizes appropriately. For example, if RBG size for BWP1 is X, RBG size for BWP2, which has double bandwidth compared to BWP1, is 2*X. In addition, by semi-statically configured RBG size(s) per BWP, configuration of different RBG sizes per BWP, which will allow better multiplexing between UEs utilizing different BWPs, may be configured. For example, if a UE with BWP 20 MHz and another two UEs with BWP 10 MHz share the same resource, RBG size for better multiplexing (either aligned to 20 MHz or aligned to 10 MHz) may be configured. Furthermore, depending on use cases, to minimize DCI overhead, it may be desirable to have configurability of RBG size.

One consideration of semi-statically configured RBG size(s) per BWP is DCI size when BWP is switched via scheduling DCI. Depending on the selected BWP where potentially different RBG size is configured, it is possible that different resource allocation field for frequency domain may be present between old and new BWP. To handle this issue, maximum bit sizes which can cover any resource allocation of the configured BWPs may be used. This may lead higher overhead. Another approach is to ensure the same resource allocation size by proper configuration. This may restrict some configuration flexibility.

Alternatively, the overall bit size may be aligned by adjusting the bit field size for time domain resource allocation depending on the RBG size, in order to keep the overall bit field size of time-and-frequency resource allocation as constant regardless of RBG size. In this case, scheduling flexibility on time domain resources will vary depending on the RBG size. In other words, it can be considered to dependency between time-domain resource allocation and frequency-domain resources.

In addition to semi-statically configured RBG size, even within the same BWP, dynamic switching of RBG size may be allowed. For example, when a UE is configured with relatively large BWP and RBG size is generally large, if the UE does not have so much data to be scheduled with, it may be desirable to have smaller RBG size to enjoy frequency diversity and better multiplexing with other UEs. To address this issue, either smaller BWP may be activated which can lead switching time overhead, or smaller RBG size may be used for better resource allocation flexibility. To support such dynamic switching of RBG sizes (e.g. between two RBG sizes) while keeping the same DCI overhead, the same number of RBGs indicated by DCI frequency resource allocation may be maintained. In other words, the overall resource allocation field size may be fixed and a combination of schedulable RBGs (the number of RBGs) and RBG sizes may be maintained such that the required bitmap size would not change with BWP switching.

Figures 11A, 11B:
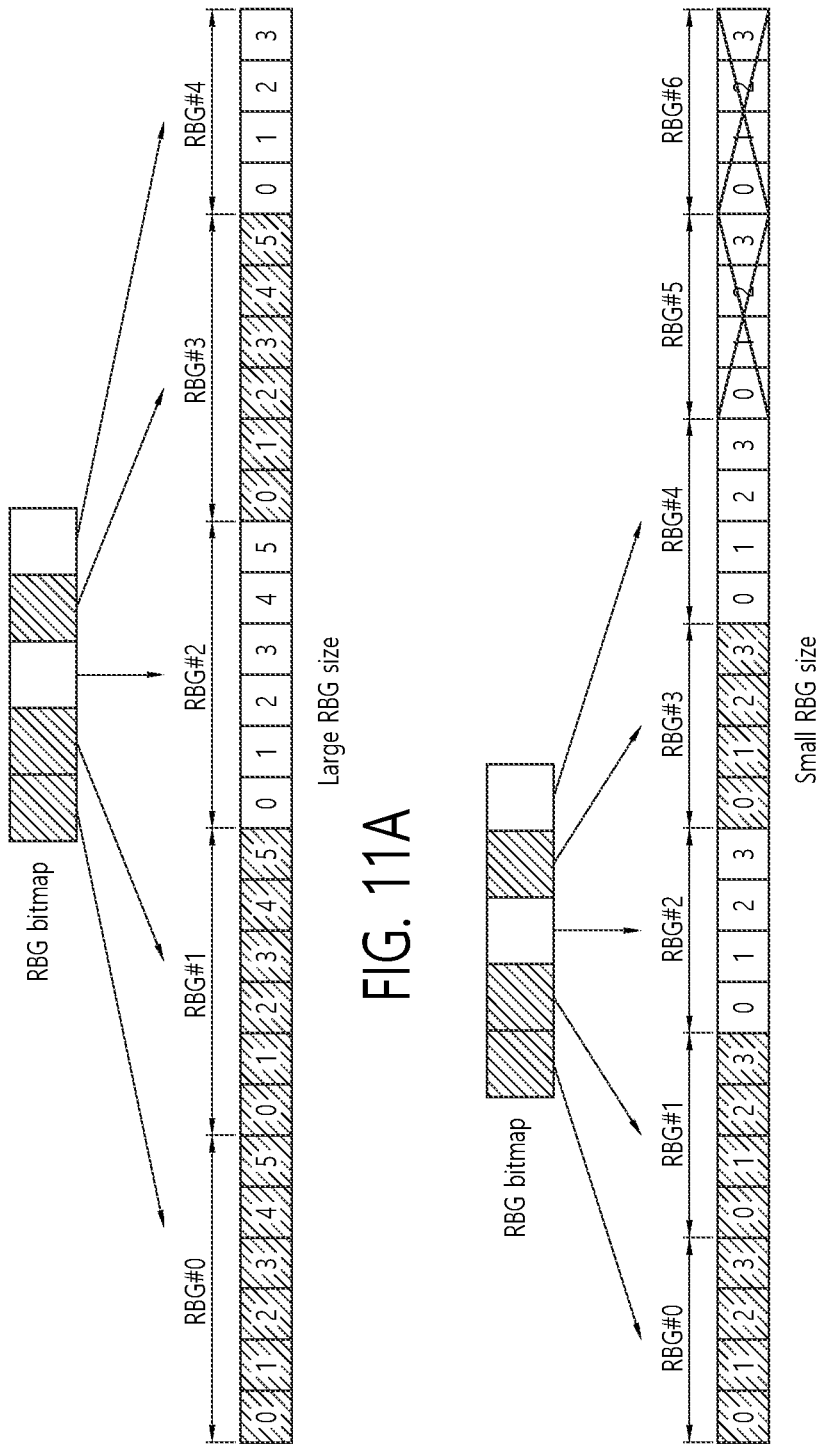
FIGS. 11A and 11B show an example for frequency-domain resource allocation for a given BWP according to an embodiment of the present invention.

FIGS. 11A and 11B show an example for frequency-domain resource allocation for a given BWP according to an embodiment of the present invention. FIG. 11A shows a case of large RB size. FIG. 11B shows a case of small RBG size.

Resource allocation consisting of RBG size and RBG bitmap within a bandwidth may be indicated by DCI. RBG bitmap may indicate all RBGs within a given BWP, and its bit field size may vary depending on the indicated RBG size. Alternatively, to keep the bit field size constant, RBG index set to be indicated by DCI may be restricted, as shown in FIG. 11B.

RBG size may also be different depending on use case or the latency and reliability requirements. For example, compact DCI for URLLC use cases may be realized by increasing RBG size. For another example, between slot and multi-slot, different RBG size may be used unless it is for the alignment of DCI sizes. To support various use cases, RBG size may be configured per DCI format for each BWP configuration.

(2) PRB Grid and PRB Indexing

A UE may be indicated with the offset between the lowest frequency and the center of SS block so that the UE has accessed for common PRB indexing. Based on the information, unless other information is also given, it is natural to construct PRB grid based on the SS block. Given the offset between the center of SS block and the lowest frequency, the number of subcarriers/RBs may be placed where the lowest frequency needs to be indicated per different numerology or subcarrier spacing.

In terms of indicating the offset between the lowest frequency and the center of SS block, (1) number of RBs of a given numerology may be indicated or (2) number of subcarriers of a given numerology may be indicated. If PRB grid of PBCH and RMSI transmission is the same as PRB grid of other transmissions, it is natural to use number of RBs as the offset. This, however, may restrict synchronization raster which needs to be at least RB bandwidth of the larger subcarrier spacing used between PBCH and RMSI. Alternatively, subcarrier grid of PBCH/RMSI transmission may be maintained because the same as subcarrier grid of other transmissions where the offset can be given as multiple of subcarriers.

To minimize ambiguity, PRB grid of PBCH and RMSI may be same as that of other transmission. Furthermore, to have aligned PRB grids among different UEs accessing different SS block, the gap between SS blocks may be at least multiple RBs based on the numerology used for PBCH. Moreover, to have aligned PRB between wideband and narrowband UEs, the gap between SS block and carrier center may also be multiple of RBs based on the numerology used for PBCH. For better PRB grid structure (e.g. more symmetric structure), subcarrier 0 of each numerology may be aligned at the center of a carrier. However, for different numerology, the gap may not be multiple of RBs depending on the gap. Thus, the gap between SS block and center of the carrier may be multiple of RBs of the largest subcarrier spacing that frequency band supports. In other words, subcarrier 0 of each numerology may be aligned with center of SS block. Or, PRB offset between subcarrier 0 and SS block may be indicated in terms of number of RBs based on the numerology used for PBCH.

Figure 12:
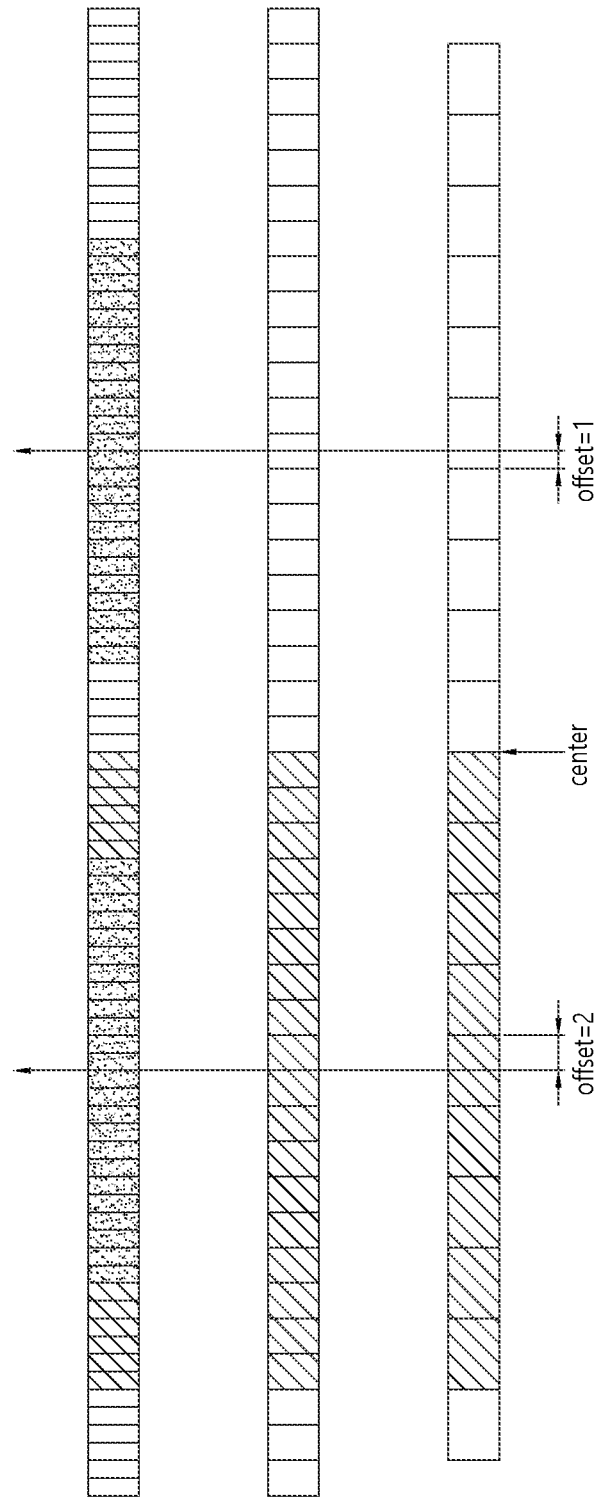
FIG. 12 shows an example of indicating PRB offset between subcarrier 0 and SS block in terms of number of RBs based on the numerology used for PBCH according to an embodiment of the present invention.

FIG. 12 shows an example of indicating PRB offset between subcarrier 0 and SS block in terms of number of RBs based on the numerology used for PBCH according to an embodiment of the present invention. Referring to FIG. 12, to align different numerology PRB grid around center, it may be necessary to indicate appropriate offset. In other words, offset between SS block and the lowest frequency may be indicated as the number of RBs of a given numerology, and additional PRB grid offset for a numerology may be necessary which can be indicated as multiple of RBs based on the numerology used in PBCH. This may be realized by indicating offset in terms of number of RBs based on the numerology used in PBCH.

9. Details of Time Domain Resource Allocation (1) One Slot Case

Considering dynamic TDD system, explicit indication of time-domain resource allocation may be used to schedule DL channels and UL channels in a slot in a dynamic manner. In this case, for efficient design of time-domain resource allocation scheme, it may be helpful to know which slot formats (which indicate DL portion, gap, and/or UL portion within a slot) will be supported in NR. Meanwhile, at least, scheduled DL resources may be different compared to slot format to be indicated by group-common PDCCH. For instance, in case of scheduled DL resources for PDSCH transmission, data transmission may start after CORESET to avoid overlapping between DL CORESET and PDSCH. Furthermore, when different guard period (GP) is used UE-specifically, end position of DwPTS may be different per each UE which can be dynamically indicated in DCI. Furthermore, different data rate matching for CSI-RS, UCI, SRS, etc., may be expected per UE depending on its numerology/measurement configurations. In this sense, indicating the same start and end position for a group of UEs may not be efficient. Even though slot format is dynamically indicated or fixed, UE-specific dynamic indication of starting and duration of PDSCH and PUSCH may be necessary. However, semi-static starting and duration may also be considered, particularly for broadcast channels such as RMSI, OSI, initial-access messages, etc.

To minimize DCI overhead and scheduling flexibility, two options may considered. First option is to utilize resource indication value (RIV)-like approach, where the possible start OFDM symbols for PDSCH or PUSCH is rather restricted (e.g. for PDSCH: 0, 1, 2, 3, for PUSCH: K+offset+0, K+offset+1, K+offset+2, K+offset+2, where K is the last OFDM symbol index of CORESET and offset is the offset between control region and the start of PUSCH for processing time, TA, switching gap, etc. the offset may be configured per each UE). Additionally, to support cross-slot scheduling, slot index may be needed. Second option is to configure a set of time domain resource patterns by RRC signaling. For instance, multiple sets of slot index, start OFDM symbol index and end OFDM symbol index within a slot may be configured by RRC signaling, and L1 signaling may indicate one of the set for time domain resource allocation.

For instance, when PDSCH or PUSCH is scheduled by DCI associated with search space for RMSI, time domain resource allocation for PDSCH or PUSCH may be configured by PBCH, RMSI, or OSI. Alternatively, considering signaling overhead, slot index and/or start OFDM symbol index may be fixed. For example, slot index of PDSCH may be the same as slot index of its associated PDCCH, while slot index of PUSCH may be fixed value (e.g. 4 slots) after its associated PDCCH transmission. Next, start OFDM symbol index of PDSCH may be set to OFDM symbol index right after CORESET duration.

(2) Multi Slot Case

Main motivation of multi-slot aggregation is to enhance detection performance of a TB by using repetition in time domain. It may be beneficial in terms of decoding complexity that PDSCH or PUSCH transmission is self-decodable in each aggregated slot. In other words, a single PDSCH or PUSCH may be mapped within a slot rather than across multiple aggregated slots.

In terms of resource allocation, multi-slot aggregation may need to support non-contiguous time domain resource allocation. For instance, UL transmission with multi-slot aggregation may need to reserve DL resources for possible DL control channel at the beginning of each aggregated slot. Similarly, DL transmission with multi-slot aggregation may need to reserve UL resources for UL control channel at the end of aggregated slot(s). These kinds of slot formats in terms of DL portion and UL portion may be different slot-by-slot. The following options may be considered for time domain resource allocation across multiple aggregated slots.

Option 1: Scheduling DCI may indicate one of RRC configured sets for time domain resource allocation parameters across aggregated slots.

Option 2: Time domain resource allocation parameters for one slot case may be applied to all the aggregated slots.

Option 3: Time domain resource allocation parameters for one slot case may be applied to certain aggregated slot(s). Remaining time domain resources across aggregated slot may be configured by additional RRC signalling and/or DCI indication.

For Option 1, RRC configured set for time-domain resource allocation may consist of start slot index, end slot index (or the number of aggregated slots), start OFDM symbol index within a slot for each aggregated slot, and end OFDM symbol index within a slot for each aggregated slot. In other words, it is necessary to configure RRC configured sets for multi-slot case in addition to RRC configured set for one slot case. Since the number of parameters within a set would be large, it may be inefficient in terms of scheduling flexibility if the resource allocation bit field size is kept to be constant. Alternatively, it may need to increase resource allocation bit field size for multi-slot case compared to one slot case.

For Option 2, since time domain resource allocation for one slot case is applied to all the aggregated slots consistently, it may not need to have additional RRC configuration or DCI bit field to support multi-slot case. However, it may be inefficient in terms of resource usage. For instance, to guarantee potential UL (or DL) transmission(s) during the aggregated slots, scheduled DL (or UL) resources in time domain may be unnecessarily smaller than the overall DL (or UL) resources in time domain across aggregated slots, respectively.

RRC configuration and DCI indication for time domain resource allocation for one slot case may need to be reused for multi-slot case considering RRC and DCI overhead. Furthermore, to enhance scheduling flexibility, addition overhead on RRC signaling and/or DCI indication may be needed. Accordingly, Option 3 may be taken into account considering trade-off between signaling overhead and scheduling flexibility.

Alternatively, slot format related information transmitted in group-common PDCCH may be used to update time domain resources of PDSCH or PUSCH in aggregated slots. However, UE may need to successfully detect both DCI scheduling PDSCH or PUSCH and group-common PDCCH. Furthermore, for data mapping purpose, at the scheduling, SFI for the scheduled slots needs to be known. If slot format is changed after scheduling data, it may cause ambiguity regarding the overall available REs. If group common PDCCH changes slot format dynamically, time domain resources for data rate matching may be configured/indicated, and puncturing may be performed if slot format is changed in the middle of multi-slot scheduling.

Another issue is whether a common time domain resource allocation is used to indicate 'same-slot', 'cross-slot' and 'multi-slot aggregation' scheduling. When dynamic BWP adaptation is achieved and cross-slot scheduling is necessary to accommodate radio frequency (RF) retuning latency, it may be desirable that same-slot and cross-slot scheduling can be indicated dynamically. In terms of multi-slot aggregation, it may be configured by the network. If multi-slot aggregation is configured, DCI may carry multi-slot aggregation which can include 'single-slot' and 'cross-slot' within the maximum number of schedulable multi-slots.

(3) Non Slot Case

There may be some differences between slot-based scheduling and mini-slot based scheduling at least in terms of DM-RS position. Further, different DCI format may be used for each scheduling. It may be necessary to clarify how slot-based scheduling and mini-slot based scheduling are differentiated. Overall, two approaches may be considered.

Implicitly: Mini-slot based scheduling and slot based scheduling may be distinguished based on the monitoring occasion of PDCCH and its periodicity. For instance, if scheduling DCI is associated with CORESET and its periodicity is multiples of slots, scheduling may be slot based scheduling. Otherwise, the scheduling may be mini-slot based scheduling.

Explicitly: Each CORESET may be configured with either slot based scheduling or mini-slot based scheduling, and DCI scheduled in that CORESET may schedule either slot-based data or mini-slot based data.

As mini-slot based scheduling may also be configured with one slot monitoring interval and monitoring may occur only in middle of slot by 7 OFDM symbol mini-slot size, slot-based scheduling may be assumed when CORESET monitoring periodicity is multiple of slots, unless it is indicated as mini-slot based scheduling. For mini-slot based scheduling, explicit indication of mini-slot based scheduling may be configured in each CORESET for mini-slot scheduling.

Non-slot case is mainly used for URLLC application. In this case, considering latency, PDCCH needs to be transmitted no later than its associated PDSCH or PUSCH transmission. Specifically, it is impossible to transmit PUSCH before decoding UL grant (except for UL transmission without grant). In case of PDSCH, UE may need to have unnecessarily excessive buffer before decoding DCI scheduling the PDSCH. For low latency, the timing difference between PDCCH and PDSCH/PUSCH needs to be small enough. Accordingly, start OFDM symbol index and end OFDM symbol index for non-slot case does not need to be defined with respect to slot boundary.

10. Details of TBS Determination (1) Parameters of Formula for TBS Determination When TBS determination is performed based on formula, it is necessary to make clear definition of parameters to be used for TB S determination. First, there may be no ambiguity on the meaning of the number of layers the codeword is mapped onto and modulation order. Next, the definition of coding rate is given by following options.

Option 1: Coding rate is the ratio of TBS to the number of overall coded bits.

Option 2: Coding rate is the ratio of TBS plus cyclic redundancy check (CRC) size(s) to the number of overall coded bits.

Coding rate is defined by the ratio of the number of information bits to the number of coded bit, and the number of coded bits may be a sum of the number of information bits and the number of parity (redundancy) bits. Since CRC is a kind of error detection code and it is derived from TBS, CRC may be seen as redundancy bits. On the other hand, from the perspective of low-density parity check (LDPC) coding, its input stream is given by TBS and CRC (CB CRC and parts of TB CRC). Therefore, CRC can be considered to be included in information bits.

Option 1 may be preferred for the definition of coding rate to ensure the same set of TBS between different base graph and its associated CRC length (e.g. 24 bits for BG 1, and 16 bits for BG 2) are used.

Regarding time/frequency resource to which the PDSCH/PUSCH is scheduled, the reference number of REs to be considered for TBS determination needs to be defined, considering some aspects such as whether or not DM-RS is included in the time/frequency resources to which the PDSCH/PUSCH is scheduled. The following options may be considered.

Option 1: The number of REs scheduled by resource allocation regardless of actual mapping of PDSCH or PUSCH.

Option 2: The number of REs to be used only for PDSCH or PUSCH without DM-RS.

Option 3: The number of REs to be used only for PDSCH or PUSCH including DM-RS.

For Option 1, the number of REs may be given by multiplication of the number of allocated symbols and the number of allocated subcarriers. For the same number of REs scheduled by DCI, the actual number of REs to be used for PDSCH or PUSCH mapping may depend on the rate-matching pattern (due to the dynamic resource sharing between PDCCH and PDSCH or other signals). In this case, TBS control may be much simpler since it just needs to consider only resource allocation field in DCI. However, it may cause large difference between the indicated coding rate and the effective coding rate after rate-matching.

Option 2 may guarantee the effective coding rate after rate-matching is equal to the indicated coding rate. However, since small changes on the number available REs can cause different value of TBS, it may be difficult to perform TBS control. Specifically, the network may restrict scheduled resources to achieve target TBS value, which is based on MAC messages to be transmitted. Otherwise, zero padding may be performed in MAC layer. Regarding DM-RS, it may need to be guaranteed that the same value of TBS is supported regardless of the DM-RS density.

Accordingly, as in Option 3, the number of available REs used for PDSCH or PUSCH may include DM-RS.

For TBS determination, it may be necessary to consider decoupling of modulation order and coding rate. In LTE, the same value of TBS is supported for the switching point of modulation order for scheduling flexibility. For simplicity, DCI may indicate modulation order and coding rate separately. However, to support the same TB S for different modulation order, coding rates to be indicated by DCI may be restricted. For instance, to support the same TBS for 16QAM and 64QAM, it may be necessary that DCI can indicate coding rate of R, coding rate of 4/6*R, and coding rate of 6/4*R. Depending on the DCI overhead, design of indication of coding rate may be restricted.

Alternatively, it may be considered to introduce scaling factor to be used in formula for TBS determination. In this case, coding rate and modulation order may be jointly indicated by MCS field in DCI, and scaling factor may be used to increase or decrease TBS value by multiplying scaling factor to the formula for TBS determination, without changes on other parameters such as scheduled resources, coding rate, and modulation order. For instance, the set of scaling factor values may be given by {1, 1/2, 4/6, 6/8} to schedule the same TBS between different modulation orders. In this case, scaling factor may be indicated by RRC signaling and/or DCI. Meanwhile, scaling factor may be used to ensure to enable the same TBS between initial transmission and re-transmission with the same/different number of PRBs or the same/different number of symbols.

(2) Special TBS Handling

Considering certain services or applications (e.g. VoIP), it may be needed to support specific value(s) of TBS. When the TBS determination is based on look-up table, then the specific value(s) of TBS may be mapped on the table. If the formula-based TBS determination is employed, special setting of DCI field(s) may be defined to indicate specific value of TBS. For instance, scaling factor may have reserved state, and if the reserved state is indicated by DCI, TBS determination may be performed based on look-up table containing specific value(s) of TBS instead of TBS formula. Alternatively, TBS may be derived from look-up table if its reference number of CB is equal to 1. Otherwise, formula-based TBS determination may be used.

(3) TBS Determination for Multi-Slot Aggregation

Even though multi-slot aggregation is configured and used, the maximum TBS may be determined based on the one slot case. Assuming that multi-slot aggregation is used for scheduling each TB in each slot repeatedly, TBS determination for multi-slot aggregation case may be dependent on MCS and reference REs in a slot. In terms of defining the reference REs in a slot, the smallest or average or the largest REs among the scheduled slots may be considered. For example, if there are full slot scheduled and the largest reference REs is chosen, full slot case may be used for TBS determination. If multi-slot is also supported for mapping a TB across multiple slot without repetition/retransmission, TBS computation of single slot case may be expanded to the multiple slot case.

In the first case, TBS may have upper limit even though the number of REs to be used for PDSCH or PUSCH increases further compared to one slot case. In this case, it may be necessary to clarify the definition of time/frequency resource to which the PDSCH/PUSCH is scheduled for multi-slot case. TBS determination for multi-slot case has following options:

Option 1: Reference number of REs for a certain aggregated slot may be used for TBS determination.

Option 2: Average value of reference number of REs over all the aggregated slots may be used for TBS determination.

Regarding Option 1, the certain aggregated slot to be used for TBS determination may be the first aggregated slot, or aggregated slot whose reference number of REs is the largest or smallest. In this case, TBS control may be quite simple by adjusting reference number of REs for a certain aggregated slot. In case of Option 2, TBS may be determined by considering all the aggregated slots.

Figure 13:
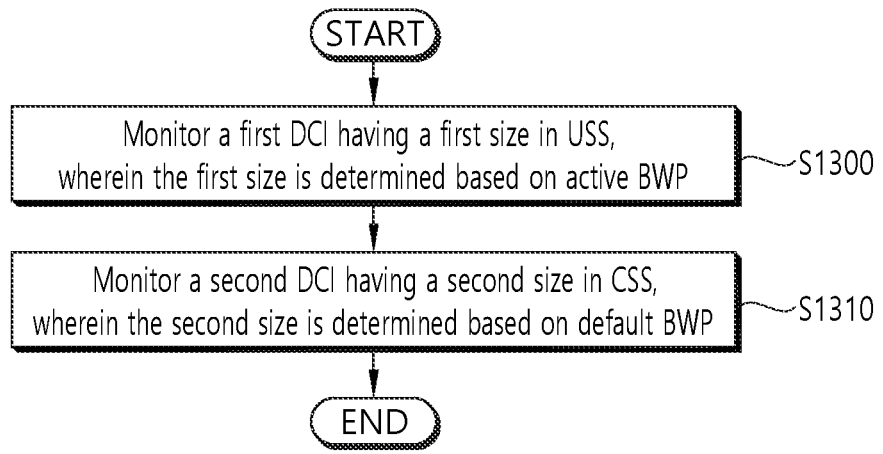
FIG. 13 shows a method for monitoring DCI by a UE according to an embodiment of the present invention.

FIG. 13 shows a method for monitoring DCI by a UE according to an embodiment of the present invention. The present invention described above for UE side may be applied to this embodiment.

In step S1300, the UE monitors first DCI having a first size in USS. The first size is determined based on an active BWP. In step S1310, the UE monitors second DCI having a second size in CSS. The second size is determined based on a default BWP.

The second DCI may be a fallback DCI. The default BWP may be an initial BWP.

The first DCI may schedule UE-specific data. The second DCI may schedule cell-specific broadcast data or UE-specific data.

The first DCI or the second DCI may be monitored in at least one slot. The first DCI or the second DCI may include first information on an index of a start slot of the at least one slot and second information on a combination of a start symbol and a length of symbols in each of the at least one slot.

According to embodiment of the present invention shown in FIG. 13, among UEs having different active BWPs, DCI format for scheduling broadcast channel and fallback DCI format, i.e. DCI format 0_0 or DCI format 1_0, can always have same size. Therefore, reliability of monitoring DCI format for scheduling broadcast channel and fallback DCI format can be enhanced.

Figure 14:
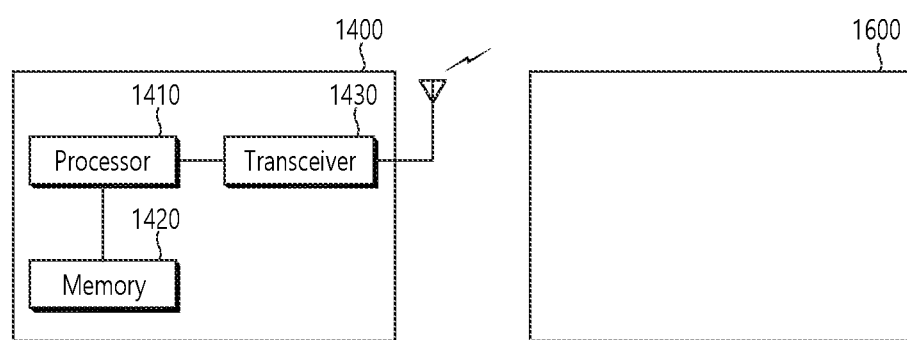
FIG. 14 shows a UE to implement an embodiment of the present invention.

FIG. 14 shows a UE to implement an embodiment of the present invention. The present invention described above for UE side may be applied to this embodiment.

A UE 1400 includes a processor 1410, a memory 1420 and a transceiver 1430.

The processor 1410 may be configured to implement proposed functions, procedures and/or methods described in this description. Layers of the radio interface protocol may be implemented in the processor 1410. Specifically, the processor 1410 controls the transceiver 1430 to monitor first DCI having a first size in USS. The first size is determined based on an active BWP. Furthermore, the processor 1410 controls the transceiver 1430 to monitor second DCI having a second size in CSS. The second size is determined based on a default BWP. The second DCI may be a fallback DCI. The default BWP may be an initial BWP. The first DCI may schedule UE-specific data. The second DCI may schedule cell-specific broadcast data or UE-specific data. The first DCI or the second DCI may be monitored in at least one slot. The first DCI or the second DCI may include first information on an index of a start slot of the at least one slot and second information on a combination of a start symbol and a length of symbols in each of the at least one slot.

The memory 1420 is operatively coupled with the processor 1410 and stores a variety of information to operate the processor 1410. The transceiver 1420 is operatively coupled with the processor 1410, and transmits and/or receives a radio signal.

According to embodiment of the present invention shown in FIG. 14, the processor 1410 can control the transceiver 1430 to monitor DCI format for scheduling broadcast channel and fallback DCI format reliably.

Figure 15:
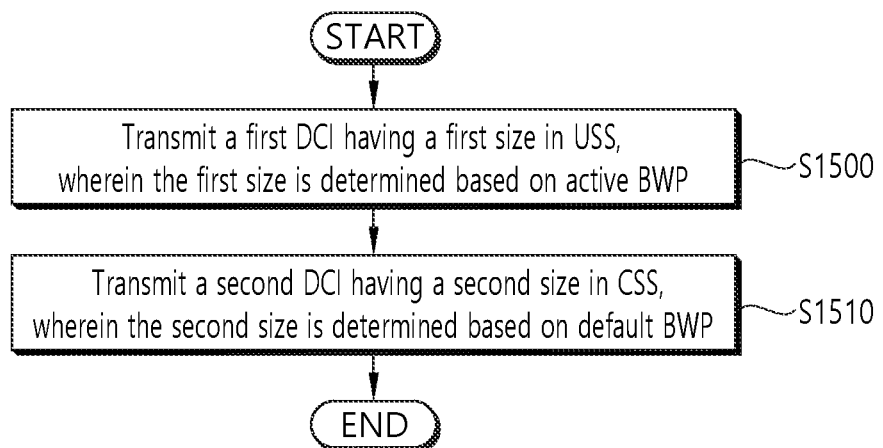
FIG. 15 shows a method for transmitting DCI by a BS according to an embodiment of the present invention.

FIG. 15 shows a method for transmitting DCI by a BS according to an embodiment of the present invention. The present invention described above for BS side may be applied to this embodiment.

In step S1500, the BS transmits first DCI having a first size in USS. The first size is determined based on an active BWP. In step S1510, the BS transmits second DCI having a second size in CSS. The second size is determined based on a default BWP.

The second DCI may be a fallback DCI. The default BWP may be an initial BWP.

The first DCI may schedule UE-specific data. The second DCI may schedule cell-specific broadcast data or UE-specific data.

The first DCI or the second DCI may be monitored in at least one slot. The first DCI or the second DCI may include first information on an index of a start slot of the at least one slot and second information on a combination of a start symbol and a length of symbols in each of the at least one slot.

According to embodiment of the present invention shown in FIG. 15, the BS can transmit DCI format for scheduling broadcast channel and fallback DCI format, i.e. DCI format 0_0 or DCI format 1_0, which have same size, to UEs configured with different active BWPs. Therefore, reliability of monitoring DCI format for scheduling broadcast channel and fallback DCI format can be enhanced.

Figure 16:
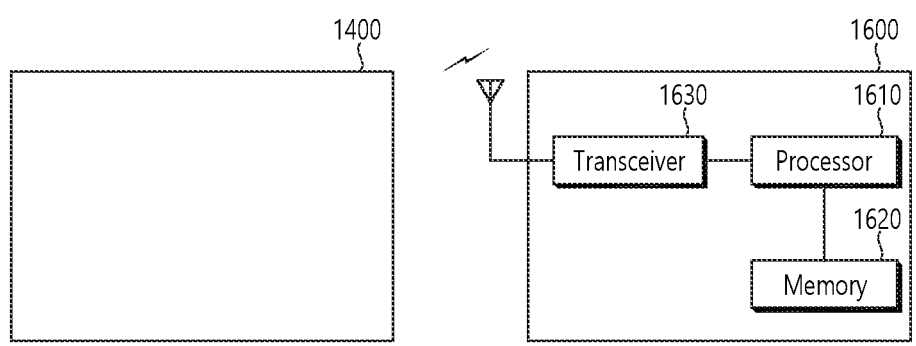
FIG. 16 shows a BS to implement an embodiment of the present invention.

FIG. 16 shows a BS to implement an embodiment of the present invention. The present invention described above for BS side may be applied to this embodiment.

A UE 1600 includes a processor 1610, a memory 1620 and a transceiver 1630. The processor 1610 may be configured to implement proposed functions, procedures and/or methods described in this description. Layers of the radio interface protocol may be implemented in the processor 1610. Specifically, the processor 1610 controls the transceiver 1630 to transmit first DCI having a first size in USS. The first size is determined based on an active BWP. Furthermore, the processor 1610 controls the transceiver 1630 to transmit second DCI having a second size in CSS. The second size is determined based on a default BWP. The second DCI may be a fallback DCI. The default BWP may be an initial BWP. The first DCI may schedule UE-specific data. The second DCI may schedule cell-specific broadcast data or UE-specific data. The first DCI or the second DCI may be monitored in at least one slot. The first DCI or the second DCI may include first information on an index of a start slot of the at least one slot and second information on a combination of a start symbol and a length of symbols in each of the at least one slot.

The memory 1620 is operatively coupled with the processor 1610 and stores a variety of information to operate the processor 1610. The transceiver 1620 is operatively coupled with the processor 1610, and transmits and/or receives a radio signal.

According to embodiment of the present invention shown in FIG. 16, the processor 1610 can control the transceiver 1630 to transmit DCI format for scheduling broadcast channel and fallback DCI format reliably.

The processors 1410, 1610 may include application-specific integrated circuit (ASIC), other chipset, logic circuit and/or data processing device. The memories 1420, 1620 may include read-only memory (ROM), random access memory (RAM), flash memory, memory card, storage medium and/or other storage device. The transceivers 1430, 1630 may include baseband circuitry to process radio frequency signals. When the embodiments are implemented in software, the techniques described herein can be implemented with modules (e.g., procedures, functions, and so on) that perform the functions described herein. The modules can be stored in memories 1420, 1620 and executed by processors 1410, 1610. The memories 1420, 1620 can be implemented within the processors 1410, 1610 or external to the processors 1410, 1610 in which case those can be communicatively coupled to the processors 1410, 1610 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a User Equipment (UE) adapted to operate in a wireless communication system, the method comprising:
   monitoring, by the UE, a Downlink Control Information (DCI) format 1_0 in a User-specific Search Space (USS),
   wherein the DCI format 1_0 is used for scheduling of a Physical Downlink Shared Channel (PDSCH),
   wherein the DCI format 1_0 includes a frequency domain resource assignment field, and
   wherein a size of the frequency domain resource assignment field included in the DCI format 1_0 monitored in the USS is determined based on a size of an active Downlink (DL) Bandwidth Part (BWP); and
   receiving, by the UE, the PDSCH via frequency resources allocated based on the frequency domain resource assignment field.

2. The method of claim 1, wherein the PDSCH scheduled by the DCI format 1_0 monitored in the USS carries downlink data specific to the UE.

3. The method of claim 1, wherein the method further comprises monitoring, by the UE, the DCI format 1_0 in a Common Search Space (CSS).

4. The method of claim 3, wherein the PDSCH scheduled by the DCI format 1_0 monitored in the CSS carries downlink data including at least one of Remaining Minimum System Information (RMSI), a Random Access Response (RAR), or a paging.

5. The method of claim 3, wherein a size of the frequency domain resource assignment field included in the DCI format 1_0 monitored in the CSS is determined based on a size of an initial DL BWP.

6. The method of claim 1, wherein the DCI format 1_0 is monitored in at least one slot.

7. The method of claim 6, wherein the DCI format 1_0 includes information related to an index of a start slot of the at least one slot and information related to a combination of a start symbol and a length of symbols in each of the at least one slot.

8. A User Equipment (UE) adapted to operate in a wireless communication system, the UE comprising:
   at least one transceiver;
   at least one processor; and
   at least one memory operably connectable to the at least one processor and storing instructions that, based on being executed by the at least one processor, perform operations comprising:
   monitoring, by the UE via the at least one transceiver, a Downlink Control Information (DCI) format 1_0 in a User-specific Search Space (USS),
   wherein the DCI format 1_0 is used for scheduling of a Physical Downlink Shared Channel (PDSCH),
   wherein the DCI format 1_0 includes a frequency domain resource assignment field, and
   wherein a size of the frequency domain resource assignment field included in the DCI format 1_0 monitored in the USS is determined based on a size of an active Downlink (DL) Bandwidth Part (BWP); and
   receiving, by the UE, the PDSCH via frequency resources allocated based on the frequency domain resource assignment field.

9. The UE of claim 8, wherein the PDSCH scheduled by the DCI format 1_0 monitored in the USS carries downlink data specific to the UE.

10. The UE of claim 8, wherein the operations further comprise monitoring, by the UE, the DCI format 1_0 in a Common Search Space (CSS).

11. The UE of claim 10, wherein the PDSCH scheduled by the DCI format 1_0 monitored in the CSS carries downlink data including at least one of Remaining Minimum System Information (RMSI), a Random Access Response (RAR), or a paging.

12. The UE of claim 10, wherein a size of the frequency domain resource assignment field included in the DCI format 1_0 monitored in the CSS is determined based on a size of an initial DL BWP.

13. The UE of claim 8, wherein the DCI format 1_0 is monitored in at least one slot.

14. The UE of claim 13, wherein the DCI format 1_0 includes information related to an index of a start slot of the at least one slot and information related to a combination of a start symbol and a length of symbols in each of the at least one slot.

15. A processing apparatus adapted to control a User Equipment (UE) in a wireless communication system, the processing apparatus comprising:
   at least one processor; and
   at least one memory operably connectable to the at least one processor,
   wherein the at least one processor is adapted to perform operations comprising:
   monitoring a Downlink Control Information (DCI) format 1_0 in a User-specific Search Space (USS),
   wherein the DCI format 1_0 is used for scheduling of a Physical Downlink Shared Channel (PDSCH),
   wherein the DCI format 1_0 includes a frequency domain resource assignment field, and
   wherein a size of the frequency domain resource assignment field included in the DCI format 1_0 monitored in the USS is determined based on a size of an active Downlink (DL) Bandwidth Part (BWP); and
   obtaining the PDSCH via frequency resources allocated based on the frequency domain resource assignment field.

* * * * *